United States Patent
Depondt

(10) Patent No.: US 10,220,816 B2
(45) Date of Patent: *Mar. 5, 2019

(54) WIPER BLADE HAVING AN ADAPTER UNIT FOR HINGING TO A WIPER ARM

(71) Applicant: Robert Bosch GmbH, Stuttgart (DE)

(72) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 797 days.

This patent is subject to a terminal disclaimer.

(21) Appl. No.: 14/605,190

(22) Filed: Jan. 26, 2015

(65) Prior Publication Data

US 2015/0135465 A1 May 21, 2015

Related U.S. Application Data

(63) Continuation of application No. 13/496,301, filed as application No. PCT/EP2010/060546 on Jul. 21, 2010, now Pat. No. 8,973,207.

(30) Foreign Application Priority Data

Sep. 15, 2009 (DE) ........................ 10 2009 029 469

(51) Int. Cl.
*B60S 1/40* (2006.01)
*B60S 1/38* (2006.01)

(52) U.S. Cl.
CPC ............. *B60S 1/4003* (2013.01); *B60S 1/387* (2013.01); *B60S 1/407* (2013.01); *B60S 1/4087* (2013.01);
(Continued)

(58) Field of Classification Search
CPC ......... B60S 1/407; B60S 1/387; B60S 1/4022
See application file for complete search history.

(56) References Cited

U.S. PATENT DOCUMENTS 6,779,223 B1 * 8/2004 Roekens ............... B60S 1/40
15/250.32
8,286,298 B2 * 10/2012 Kim ....................... B60S 1/387
15/250.32
(Continued)

FOREIGN PATENT DOCUMENTS

CN 1663853 9/2005
CN 1676383 10/2005
(Continued)

OTHER PUBLICATIONS

PCT/EP2010/060546 International Search Report dated Oct. 19, 2010 (3 pages).

*Primary Examiner* — Michael Jennings
(74) *Attorney, Agent, or Firm* — Michael Best & Friedrich LLP

(57) ABSTRACT

In a wiper blade (100) for a windscreen wiper, having a wiper strip (112) and an adapter unit (105) for hinging the wiper blade (112) to a wiper arm, wherein the adapter unit (150) is attached at a base connection device (160) provided on the wiper strip (112) and is configured for connection to a connection member associated with the wiper arm. The adapter unit (150) includes a guide adapter (250) permanently connected to the base connection device (160) and having guide elements (352, 354, 356, 358) that are spherically curved at least in sections. The guide adapter is detachably connected to a function adapter (280) configured for connection to the connection member and including slide elements (382, 386) that are slidably displaceable on the guide elements (352, 354, 356, 358) such that the function adapter (280) is movable at least from a released position into a holding position by a combined translatory and rotary movement relative to the guide adapter (250).

24 Claims, 18 Drawing Sheets

(52) U.S. Cl.
CPC .......... *B60S 2001/4022* (2013.01); *B60S 2001/4054* (2013.01)

(56) References Cited

U.S. PATENT DOCUMENTS

| | | | | |
|---|---|---|---|---|
| 8,505,151 | B2 * | 8/2013 | Depondt | B60S 1/387 15/250.32 |
| 2008/0289133 | A1 * | 11/2008 | Kim | B60S 1/387 15/250.32 |
| 2009/0151110 | A1 | 6/2009 | Ku | |
| 2010/0005609 | A1 * | 1/2010 | Kim | B60S 1/387 15/250.32 |
| 2011/0047742 | A1 | 3/2011 | Kim et al. | |

FOREIGN PATENT DOCUMENTS

| | | |
|---|---|---|
| CN | 101151180 | 3/2008 |
| DE | 10320930 | 11/2004 |
| DE | 102007021333 | 11/2008 |
| DE | 102008042516 | 5/2009 |
| EP | 2020351 | 2/2009 |
| EP | 2080680 | 7/2009 |
| KR | 100891195 | 3/2009 |
| WO | 2008145481 | 12/2008 |

* cited by examiner

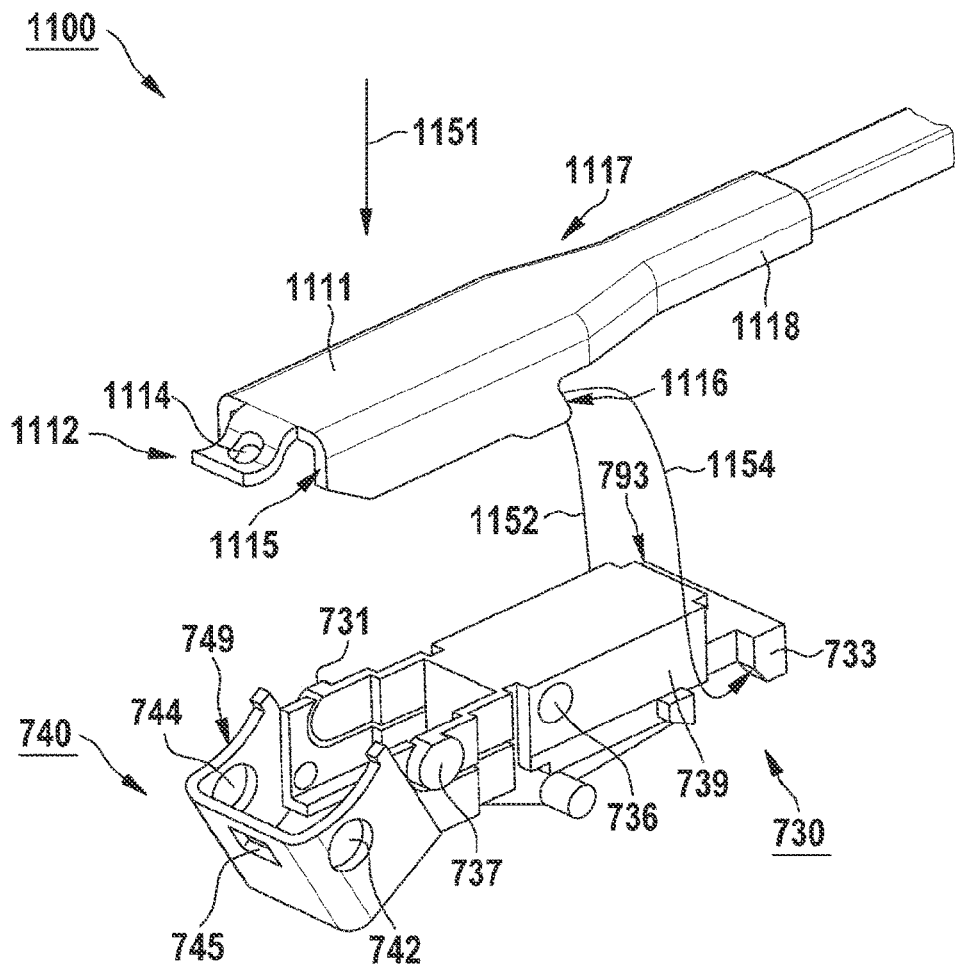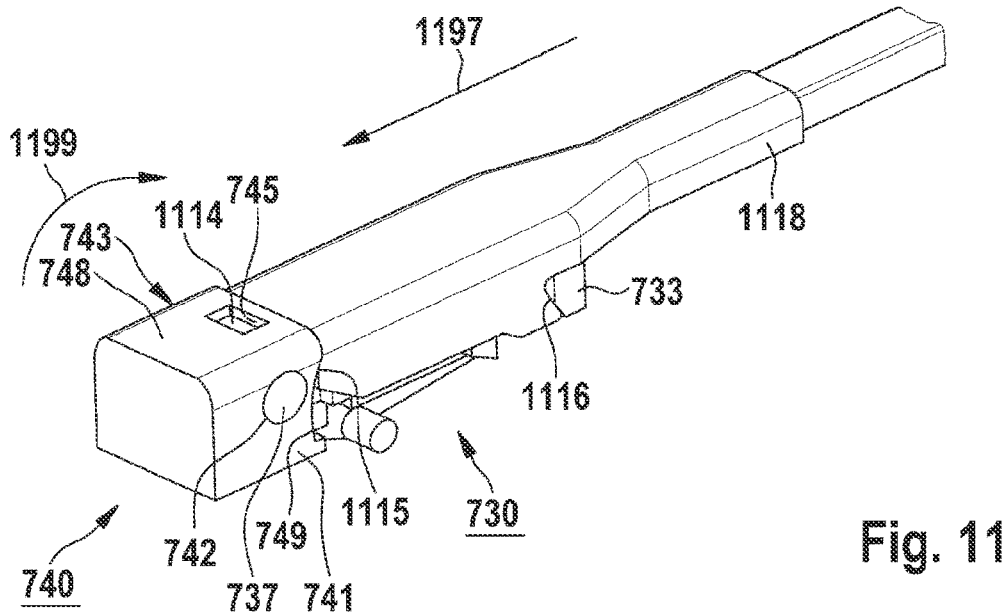
Fig. 11

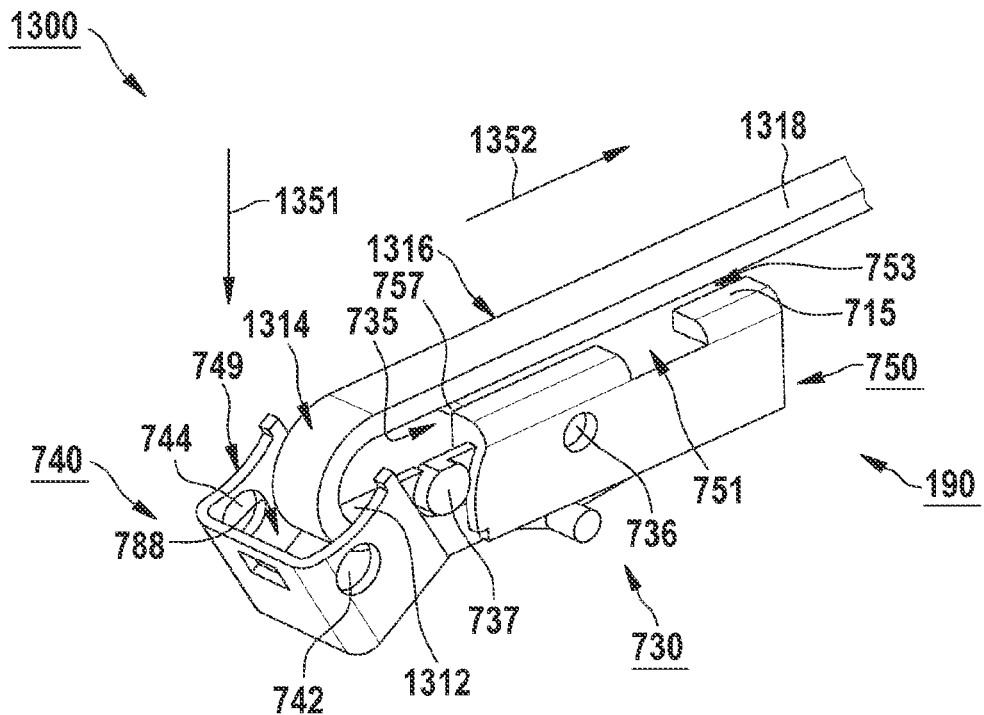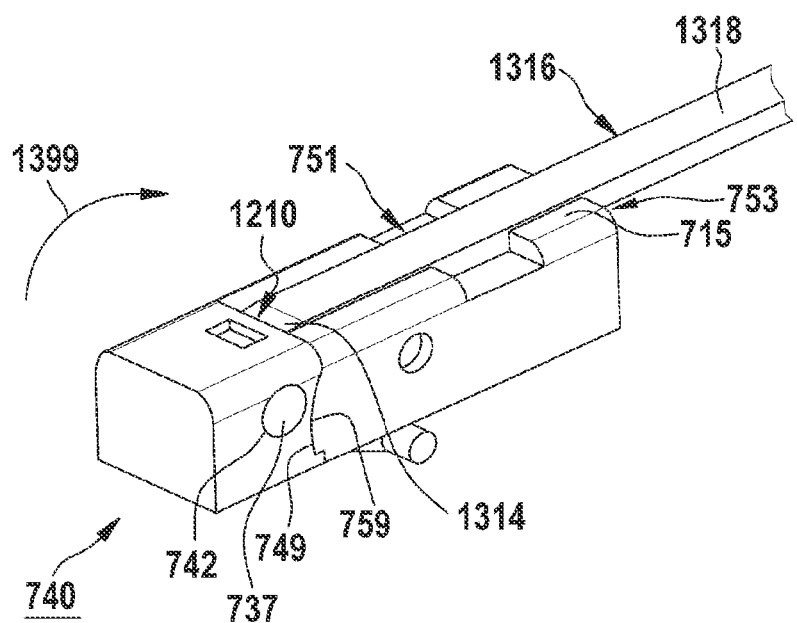
Fig. 13

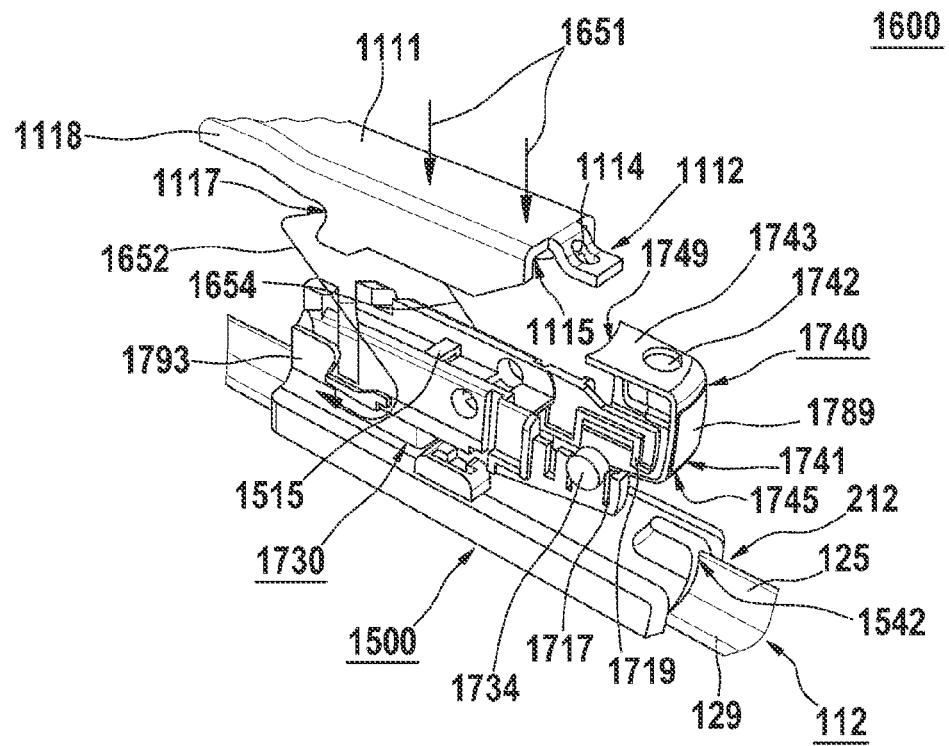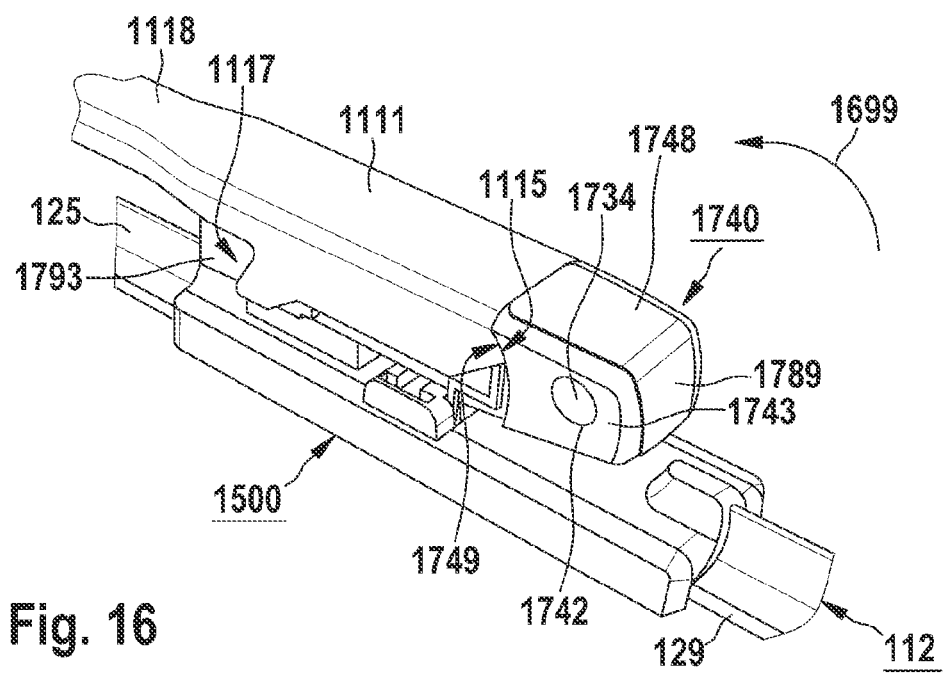
Fig. 16

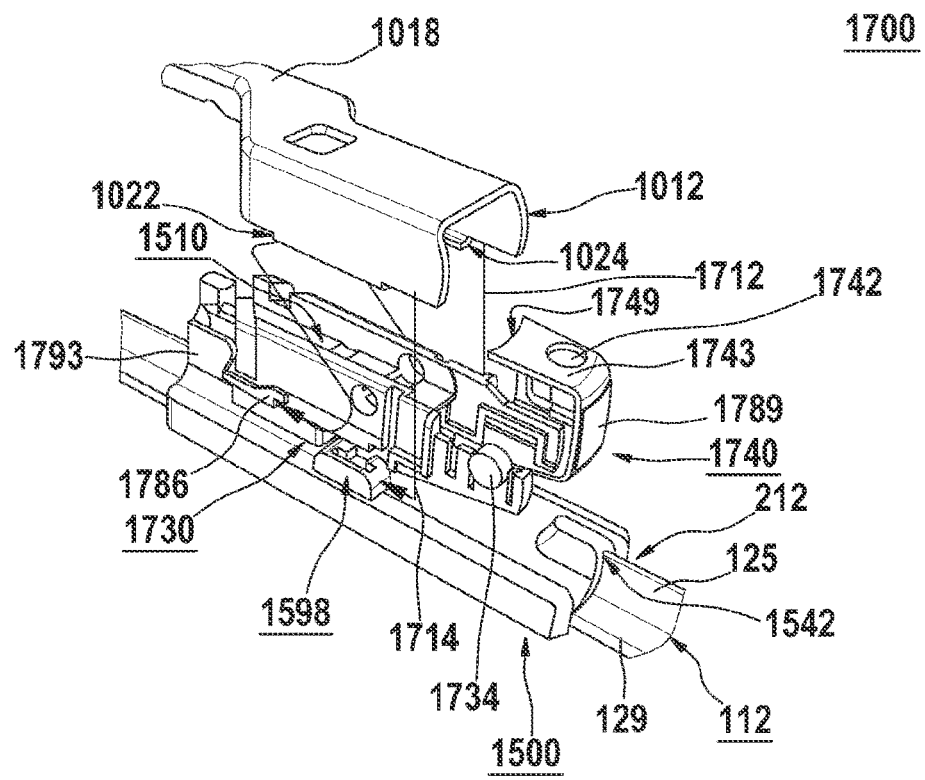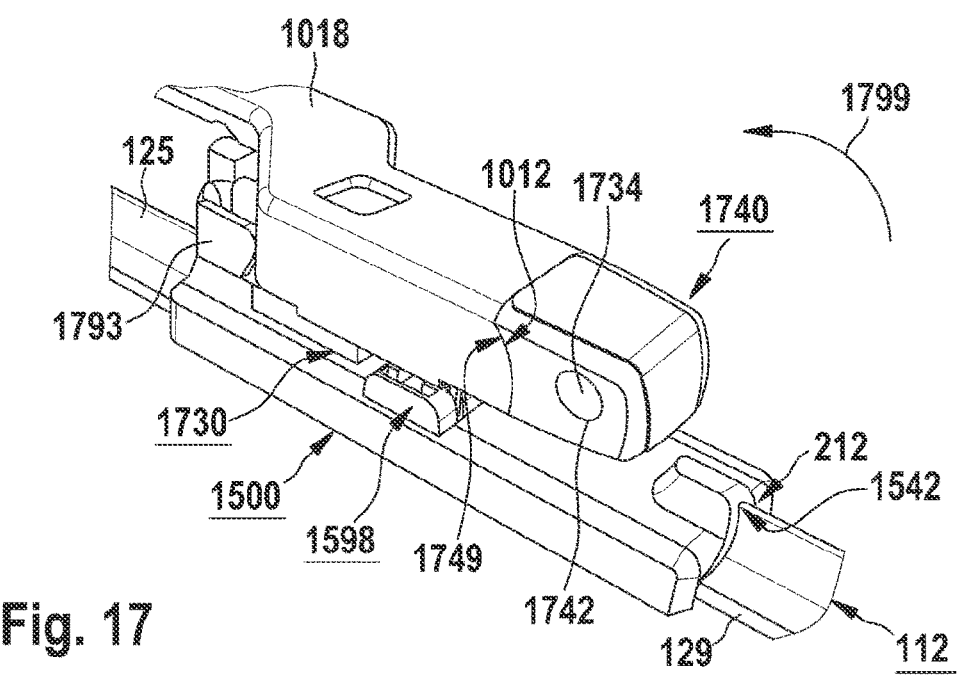
Fig. 17

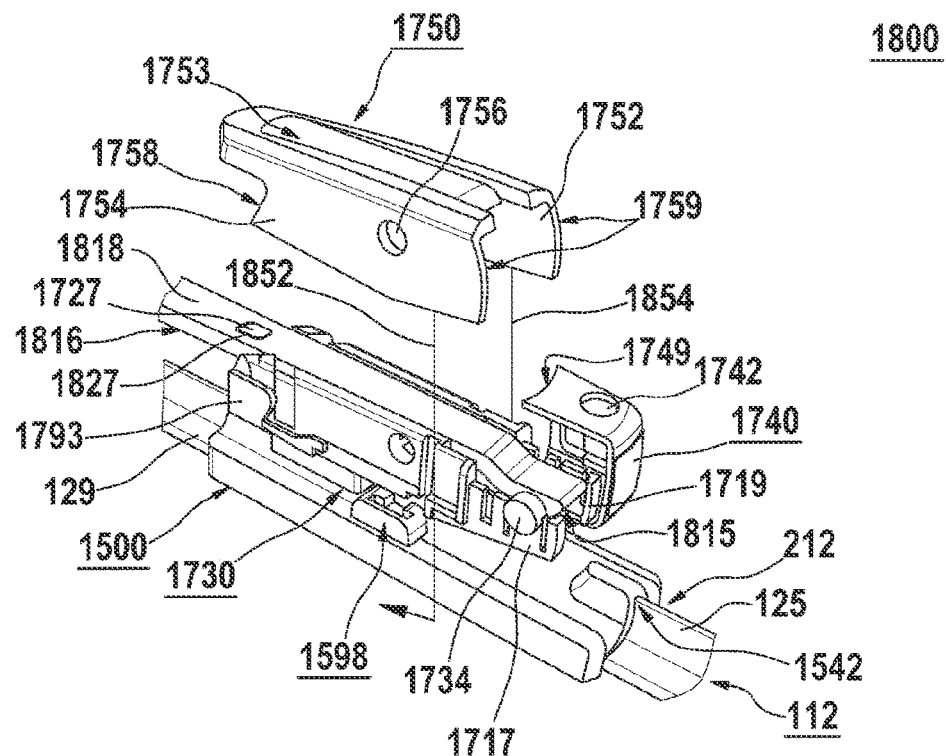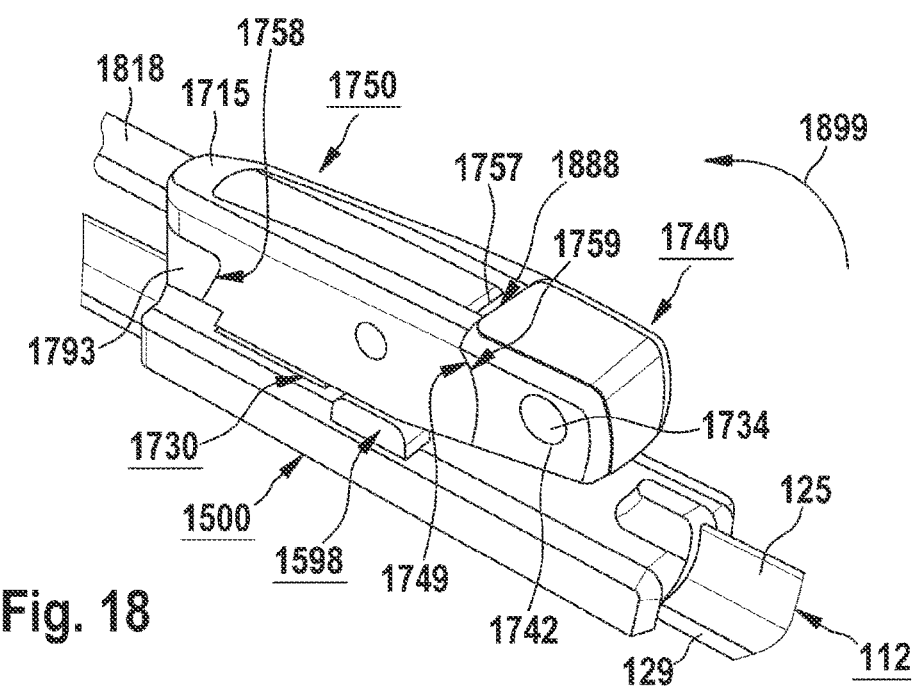
Fig. 18

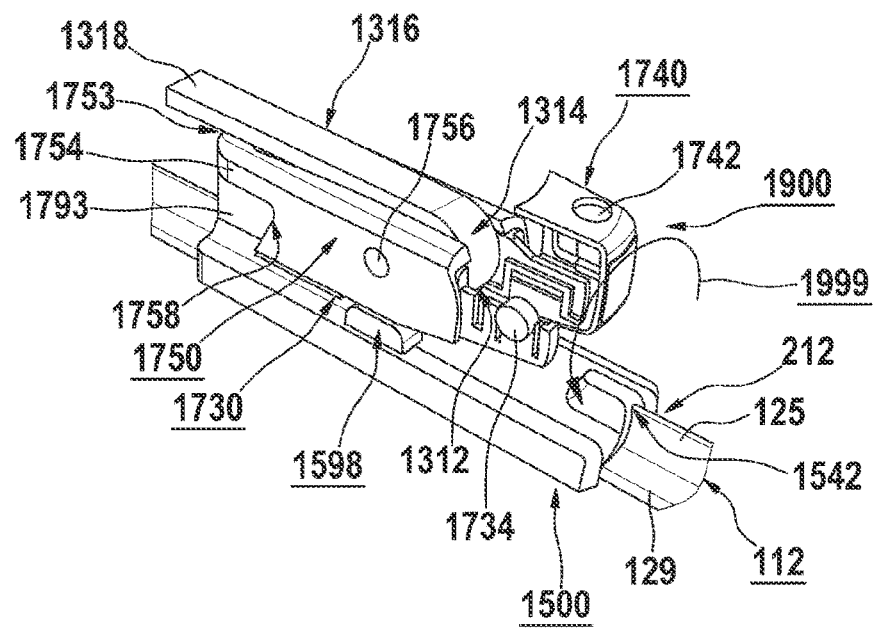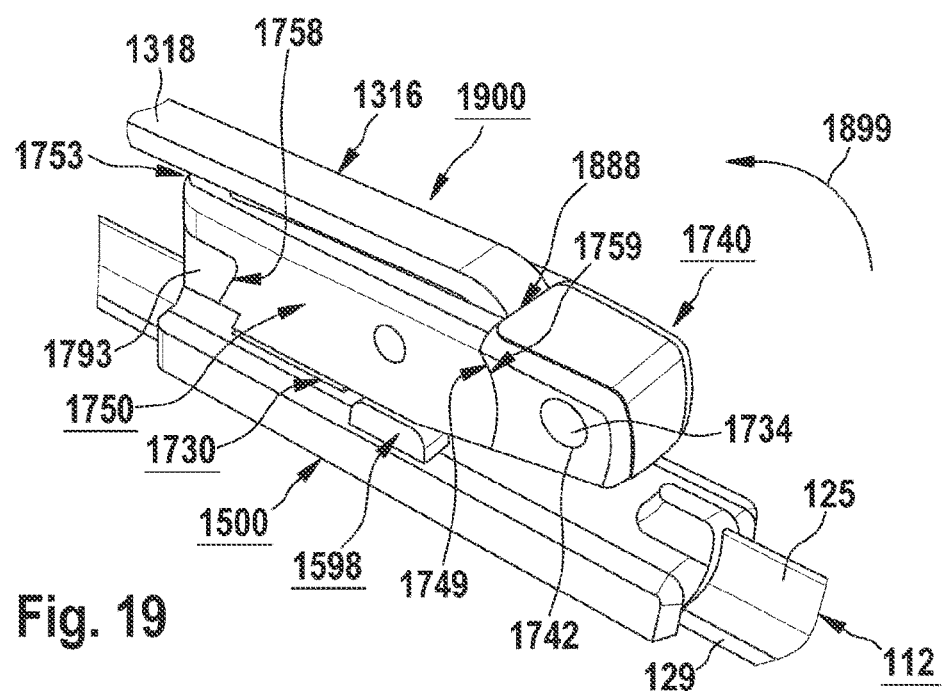
Fig. 19

WIPER BLADE HAVING AN ADAPTER UNIT FOR HINGING TO A WIPER ARM

CROSS-REFERENCE TO RELATED APPLICATIONS

This application is a continuation of U.S. patent application Ser. No. 13/496,301, filed May 29, 2012, which is a 371 application of international PCT/EP2010/060546, filed Jul. 21, 2010, which claims priority to DE 102009029469.4, filed Sep. 15, 2009, the entire contents of each of which are incorporated herein by reference.

BACKGROUND OF THE INVENTION

The present invention relates to a wiper blade for a window wiper, with a wiper strip and an adapter unit for attachment of the wiper strip to a wiper arm, wherein the adapter unit is fastened to a base connecting device provided on the wiper strip and is designed for connection to a connecting member assigned to the wiper arm.

WO 2008/145481 A1 describes a wiper blade of this type, in which an adapter unit is fastened by means of a snap-in connection to a base connecting device. For this purpose, the adapter unit has two snap-in pegs with widened, circular-arc-shaped ends, and the base connecting device has two associated snap-in retainers with elastic retaining arms, wherein in each case two retaining arms, with a circular-arc-shaped indentation, form a snap-in retainer. During the fastening of the adapter unit to the base connecting device, the adapter unit is initially mounted with a front axial end region on the base connecting device at a predefined angle, and is then turned with its rear axial end region in the direction of the base connecting device until the snap-in pegs bear against the snap-in retainers. The snap-in pegs are then pressed against the associated snap-in retainers, wherein the circular-arc-shaped ends of the snap-in pegs initially bend the elastic retaining arms of the associated snap-in retainer apart before then engaging into the corresponding circular-arc-shaped indentations. Here, the retaining arms spring back into their initial position and surround the circular-arc-shaped ends, which engage into the circular-arc-shaped indentations, of the snap-in pegs.

A disadvantage of said prior art is that, for example if the adapter unit becomes jammed on the base connecting device during the mounting process, the pressure subsequently to be exerted during the rotational movement to produce the snap-in connection may cause damage to or destruction of individual components of the adapter unit or of the base connecting device.

EP 2 020 351 A1 likewise describes a wiper blade with a wiper strip on which is provided a base connecting device which can be connected to an adapter unit. The adapter unit has linear sliding elements which are displaceable in a sliding fashion in associated longitudinal grooves of the base connecting device. To fasten the adapter unit to the base connecting device, the sliding elements are inserted into the longitudinal grooves, and the adapter unit is pushed with a translational movement onto the base connecting device and latched to the latter by means of latching elements assigned to the base connecting device.

A disadvantage of said prior art is that, during the fastening of the adapter unit to the base connecting device, precise insertion of the sliding elements into the longitudinal grooves is necessary because the adapter unit may otherwise become jammed on the base connecting device during the subsequent translational movement. If, in the event of such jamming, an excessively high pressure is exerted to continue the translational movement, this may lead to damage to or destruction of the adapter unit or of the base connecting device.

SUMMARY OF THE INVENTION

It is therefore the object of the invention to provide a novel wiper blade for a window wiper, which wiper blade has an adapter unit which is easy to handle and which can be fastened quickly and securely to a base connecting device provided on a wiper strip.

This problem is solved by a wiper blade for a window wiper, with a wiper strip and an adapter unit for attachment of the wiper strip to a wiper arm, wherein the adapter unit is fastened to a base connecting device provided on the wiper strip and is designed for connection to a connecting member assigned to the wiper arm. The adapter unit has a guide adapter which is fastened permanently to the base connecting device and which has guide elements which are designed to be at least partially three-dimensionally curved. Said function adapter has sliding elements which are displaceable in a sliding fashion on the guide elements in such a way that the function adapter can, by a combined translational and rotational movement relative to the guide adapter, be moved at least from a release position into a retaining position.

The invention thus makes it possible to provide a wiper blade with an adapter unit that can be mounted in a simple manner.

The guide elements are preferably at least partially of elongated S-shaped design.

It is thereby possible to provide a guide adapter with guide elements which are of simple and uncomplicated design.

The guide elements and the sliding elements are preferably formed with a substantially identical shaping.

Secure and reliable guidance of the function adapter on the guide adapter can thereby be ensured.

The guide adapter preferably has at least one actuable latching element which, in the retaining position, is latched releasably to the function adapter, wherein the latching can be released by actuation of the latching element.

The invention therefore permits secure and stable fastening of the function adapter to the guide adapter.

The guide adapter is preferably permanently latched to the base connecting device by a snap-in connection, wherein retaining arms are provided on the guide adapter, which retaining arms are interlocked on associated retaining indentations of the base connecting device.

Simple and fast fastening of the guide adapter to the base connecting device can thereby be attained.

The guide adapter preferably has pocket-like receiving elements into which associated projections of the base connecting device engage.

It is thereby possible to permit precise and fast positioning of the guide adapter on the base connecting device during assembly.

In one embodiment, the connecting member has a fastening member which can be mounted on the function adapter.

The invention therefore makes it possible for the wiper blade to be fastened simply and securely to a corresponding wiper arm.

The fastening member is preferably designed for attachment to a first multiplicity of different wiper arm types.

It is thereby possible, through the provision of one simple and cheap fastening member, for the wiper blade to be attached to a plurality of different wiper arms.

The fastening member can preferably be connected to an adapter element which is designed for attachment to a second multiplicity of different wiper arm types which differ from the wiper arm types of the first multiplicity of wiper arm types.

It is thereby possible, through the provision of one simple and cheap additional element, that is to say the adapter element, for the wiper blade to be attached to an even greater number of different wiper arms.

The adapter element engages at least partially around the fastening member in a claw-like manner.

Secure and stable fastening of the adapter element to the fastening member can thereby be ensured.

In one embodiment, the connecting member has a cover member by means of which at least a plurality of different wiper arm types can be fixed to the connecting member.

The invention therefore permits simple and reliable fixing of the wiper blade to a corresponding wiper arm.

The cover member can preferably be fastened to the fastening member by means of a snap-in connection.

The cover member can thereby be fastened in a secure and stable manner to the fastening member.

In one embodiment, the function adapter has a bearing element on which the connecting member can be mounted.

The invention therefore permits simple and uncomplicated mounting of the connecting member on the function adapter.

The bearing element has at least two wall elements aligned parallel to each other for at least partially laterally supporting the connecting member.

Lateral slippage of the connecting member on the function adapter can thereby be prevented in a simple manner.

The problem stated in the introduction is also solved by means of an adapter unit for attachment of a wiper strip, which is assigned to a wiper blade for a window wiper, to a wiper arm. The adapter unit can be fastened to a base connecting device provided on the wiper strip and is designed for connection to a connecting member assigned to a wiper arm. The adapter unit has a guide adapter which is fastened permanently to the base connecting device and which has guide elements which are designed to be at least partially three-dimensionally curved, which guide adapter is connected releasably to a function adapter designed for connection to the connecting member. Said function adapter has sliding elements which are displaceable in a sliding fashion on the guide elements in such a way that the function adapter can, by a combined translational and rotational movement relative to the guide adapter, be moved at least from a release position into a retaining position.

BRIEF DESCRIPTION OF THE DRAWINGS

The invention is explained in more detail in the description below with reference to exemplary embodiments which are illustrated in the drawings, in which:

FIG. 11 shows a perspective view of the connecting member from FIG. 7 during attachment to a second wiper arm type, FIG. 13 shows a perspective view of the connecting member from FIG. 7 during attachment to a fourth wiper arm type, FIG. 16 shows a perspective view of the wiper blade detail from FIG. 15 with the connecting member during attachment to a first wiper arm type, FIG. 17 shows a perspective view of the wiper blade detail from FIG. 15 with the connecting member during attachment to a second wiper arm type, FIG. 18 shows a perspective view of the wiper blade detail from FIG. 15 with the connecting member during attachment to a third wiper arm type, FIG. 19 shows a perspective view of the wiper blade detail from FIG. 15 with the connecting member during attachment to a fourth wiper arm type.

DETAILED DESCRIPTION

Figure 1:
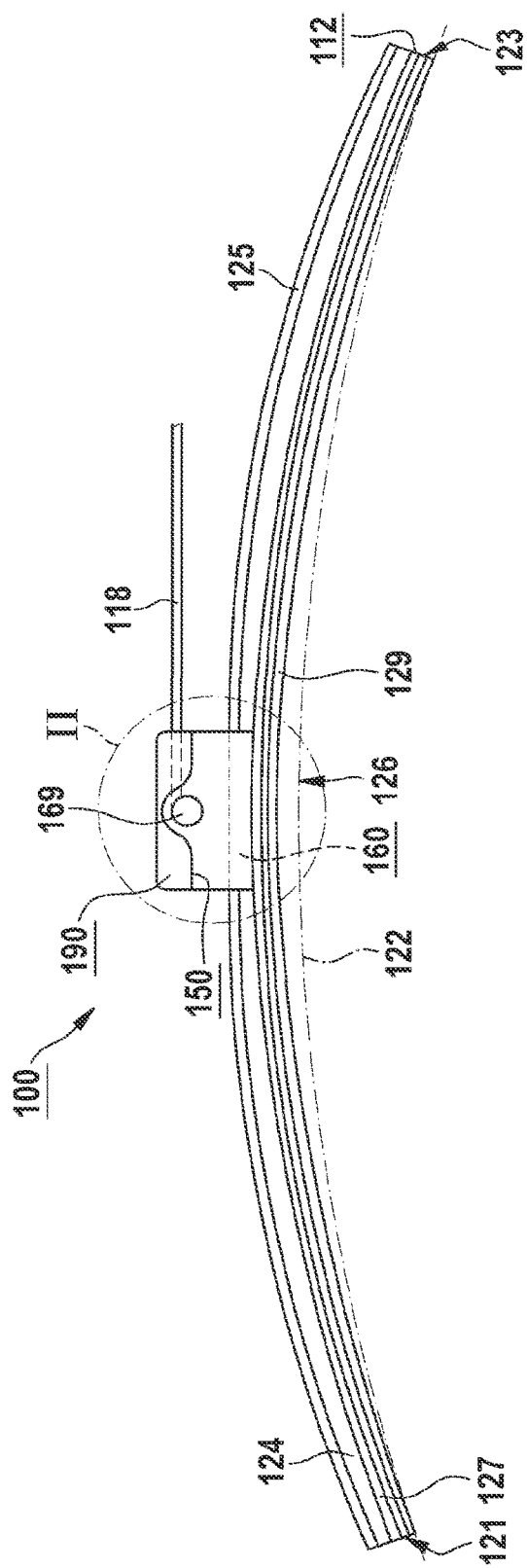
FIG. 1 shows a side view of a wiper blade, with a wiper strip, to which a base connecting device is fastened, and with an adapter unit which is fastened to the latter and is fastened to a connecting member assigned to a wiper arm, according to the invention.

FIG. 1 shows a wiper blade 100 with a wiper strip 112 which has a wiper lip 129 connected to a back strip 124 via a tilting web 127. A spoiler 125 is provided on the back strip 124. A base connecting device 160, to which an adapter unit 150 for the connection of a connecting member 190 assigned to a wiper arm 118 is fastened, is provided on the wiper strip 112. In FIG. 1, the connecting member 190 is connected to the adapter unit 150, for example, via a hinge pin 169. With the aid of the wiper arm 118, the wiper blade 100 can be guided over a window 122 (illustrated by a chain-dotted line), for example a motor vehicle window, for wiping purposes.

According to an embodiment, the wiper blade 100 is a flat-bar construction, i.e. the wiper strip 112 has lateral longitudinal grooves in which two supporting rails, preferably spring rails, are arranged. As an alternative thereto, the wiper strip 112 can be designed as a hollow profile with an approximately central longitudinal channel in which an individual supporting rail is arranged. The wiper strip 112 with the base connecting device 160 provided thereon is preferably of hinge-free design, the base connecting device 160 preferably being preassembled on the wiper strip 112.

In FIG. 1, the wiper blade 100 has not yet been completely placed onto the window 122; only the axial wiper blade ends 121, 123 of said wiper blade bear against the window 122 while the wiper strip 112 is still spaced apart from the window 122 in the wiper blade center 126, i.e. approximately in the region of the adapter unit 150. If a designated contact pressure is exerted on the connecting member 190 and therefore the adapter unit 150 via the wiper arm 118, the wiper strip 112 is placed against the window 122. This results in a uniform contact pressure over the entire length of the wiper blade even if the curvature of the window changes over the course of the wiping movement.

Figure 2:
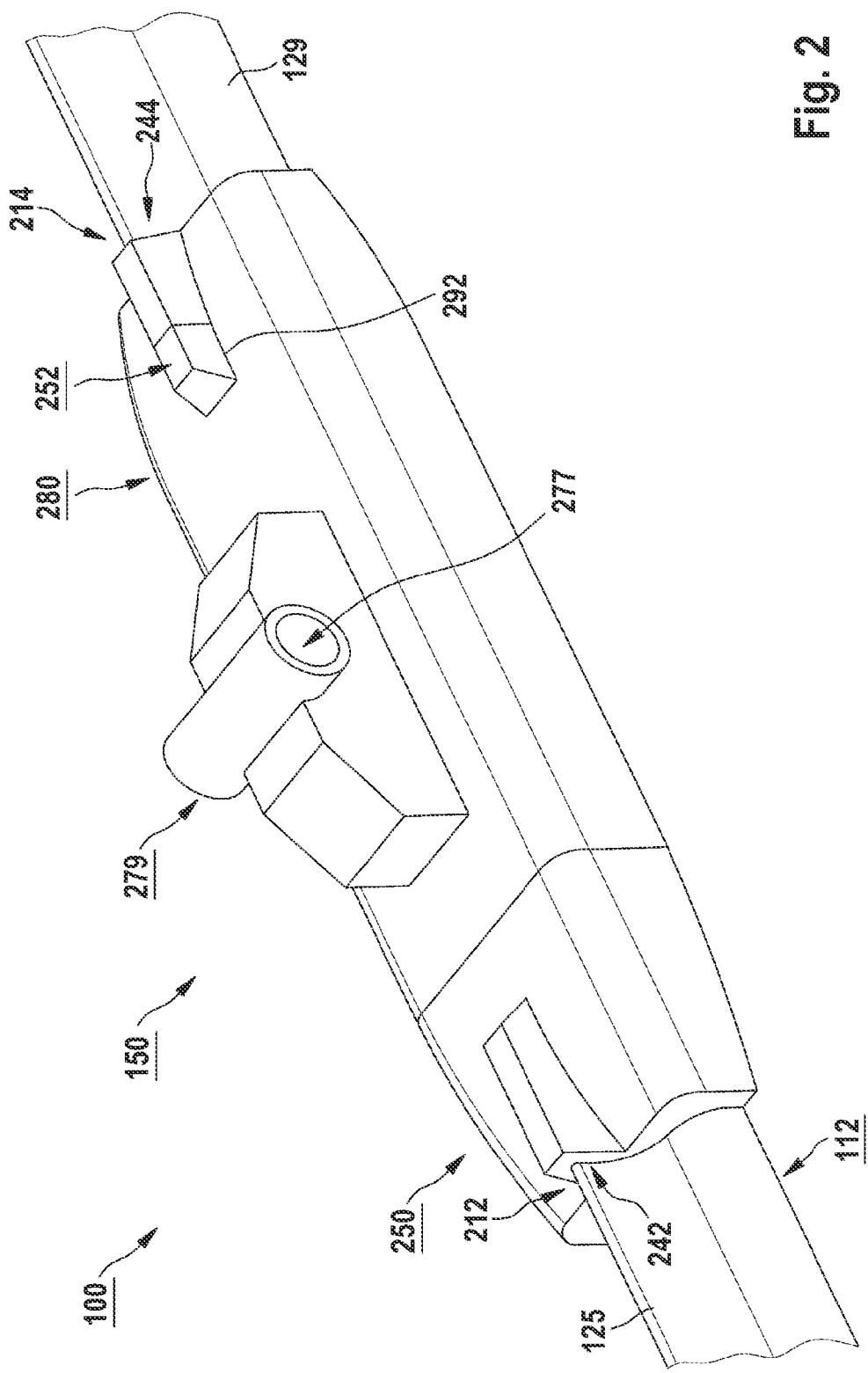
FIG. 2 shows a perspective view of a detail II of the wiper blade from FIG. 1 in the fitted state, according to an embodiment.

FIG. 2 shows a detail, which is identified by II in FIG. 1, of the wiper blade 100 with the wiper strip 112 and the adapter unit 150 in the fitted state according to an embodiment. The adapter unit 150 has a guide adapter 250 and a function adapter 280.

In the illustration, the guide adapter 250 is fastened permanently to the base connecting device 160 from FIG. 1. Within the context of the present invention, "permanently" is to be understood as meaning that means for releasing the guide adapter 250 from the base connecting device 160 are not provided, and therefore release without using force is preferably impossible. However, it is pointed out that, alternatively, a releasable connection between the guide adapter 250 and base connecting device 160 from FIG. 1 may be used, for example a latching connection via suitable latching and mating latching means.

A receiving groove 242 for receiving a first end region 212 of the spoiler 125 is formed at least in regions at an axial end region (shown on the left in FIG. 2) of the guide adapter 250. An actuable latching element 252 is formed at the axial end region (shown on the right in FIG. 2) of said guide adapter.

In the illustration, the function adapter 280 has a bearing element 279 on which the connecting member 190 from FIG. 1 can be mounted. The bearing element 279 has, by way of example, a circular aperture 277 through which, for example, the hinge pin 169 from FIG. 1 can be passed. However, it is pointed out that the bearing element 279 with the aperture 277 is depicted in FIG. 2 merely by way of example and not to restrict the invention. On the contrary, the bearing element 279 may have a multiplicity of different configurations which may be dependent, for example, on a configuration of the connecting member 190 from FIG. 1, as described by way of example for FIG. 7.

A cutout 292 for at least partially receiving the latching element 252 is provided on the axial end region (shown on the right in FIG. 2) of the function adapter 280. According to an embodiment, the function adapter 280 is connected releasably to the guide adapter 250, as described in detail below for FIG. 6. Furthermore, at least in regions of said end region there is a receiving groove 244 for receiving a second end region 214 of the spoiler 125.

Figure 3:
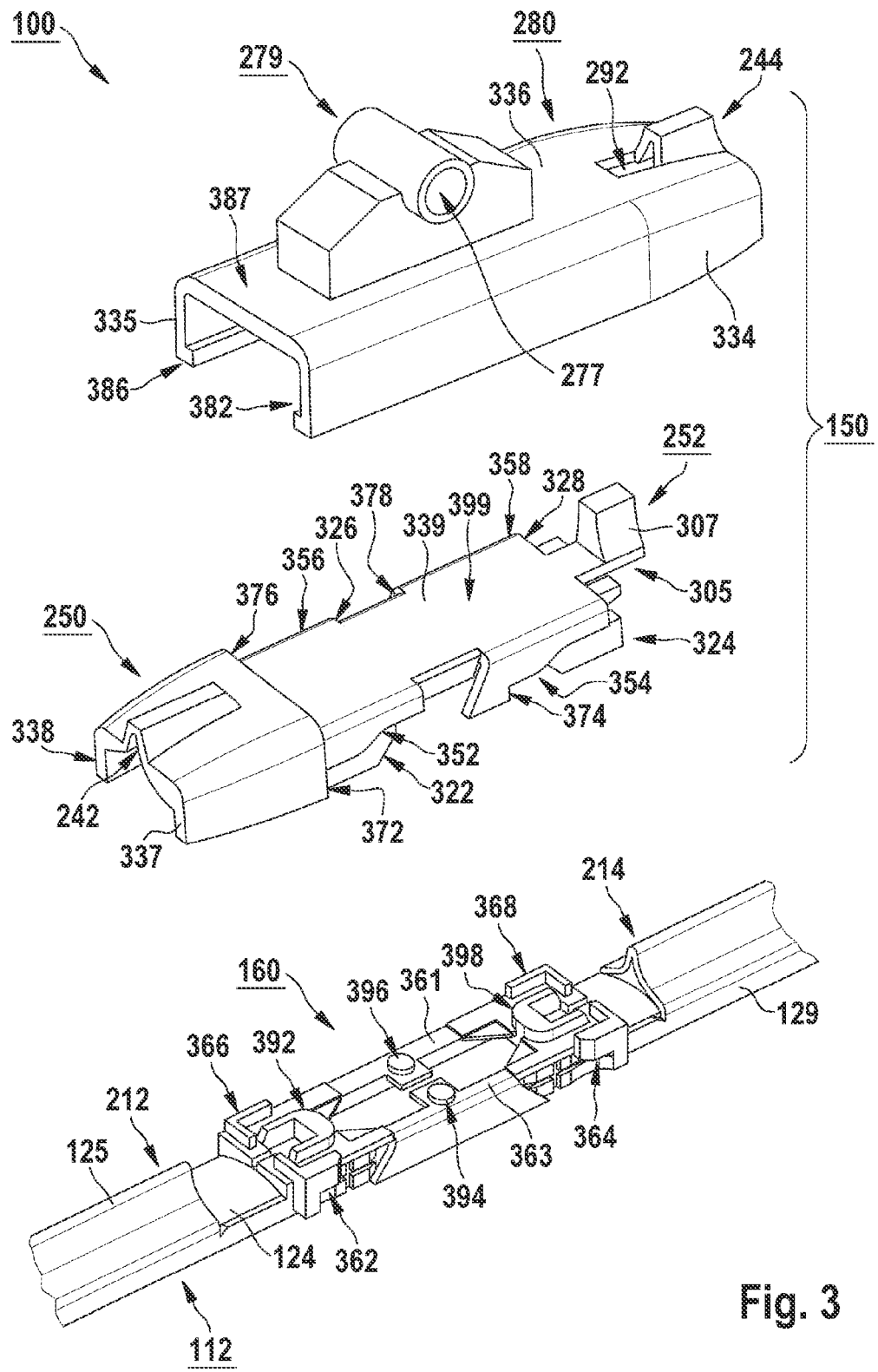
FIG. 3 shows a perspective view of the wiper blade detail from FIG. 2, with the wiper strip provided with the base connecting device and with the adapter unit provided with a guide and a function adapter, according to a first embodiment, in the unfitted state.

FIG. 3 shows the wiper blade detail from FIG. 2 with the wiper strip 112 and the base connecting device 160 fastened to the latter, and with the adapter unit 150, in the unfitted state. FIG. 3 shows clearly those end regions 212, 214 of the spoiler 125 which face the base connecting device 160.

The base connecting device 160 consists by way of example of a first connecting rail 361 and a second connecting rail 363. The connecting rails 361, 363 engage around at least part of the back strip 124 of the wiper strip 112, which back strip is connected to the wiper lip 129, and are preferably anchored, for example permanently latched, fixedly to each other and therefore to the back strip 124. For the permanent latching, the rails 361, 363 preferably have suitable latching and mating latching means. However, it is pointed out that the anchoring of the rails 361, 363 to each other can also be achieved by other equivalent means, for example by snap-in or clamping connections. The present invention is therefore not limited to the use of latching and mating latching means.

In order to permanently fasten the guide adapter 250 to the base connecting device 160, a plurality of shoulder-shaped retaining indentations 362, 364, 366, 368 are provided thereon. Column-like projections 392, 398 are formed in the axial end regions of the base connecting device 160 and, for example, two pin-shaped projections 394, 396 are provided in the central region of said base connecting device. Said projections 392, 394, 396, 398 serve as positioning elements in order to enable precise alignment and installation of the guide adapter 250, as described below for FIG. 6. Furthermore, at least the positioning elements 394, 396 have, for example, according to an embodiment, pin-like extensions which are formed in the direction of the wiper strip 112 and can be fixed to the wiper strip 112 during the fastening of the base connecting device 160 in order therefore to prevent the device 160 from slipping on the wiper strip 112. The extensions here may be pressed, for example in the manner of nails, into the wiper strip or may be anchored there by displacement of the rubber material of the wiper strip 112.

The adapter unit 150 with the guide adapter 250 and the function adapter 280, the upper sides 387 and 399, respectively, of which are shown in FIG. 3, is produced, for example, from plastic. The guide adapter 250 is designed by way of example in the manner of an upside down U profile and has a platform-like base element 339, on which two lateral wall elements 337, 338 are formed. Furthermore, the latching element 252, which has, for example, a resilient latching tongue 305 with a latching cam 307, is formed on the platform 339 in the manner of a tail. Guide elements 352, 354 and 356, 358, which are designed to be at least partially three-dimensionally curved, are provided on the wall elements 337, 338, respectively. Said guide elements are preferably inclined discontinuously and, in the illustration, are at least partially of elongated S-shaped design. The guide elements 352, 354, 356, 358 are provided with associated blocking members 372, 374, 376, 378, the function of which is described below for FIG. 6. For the permanent fastening of the guide adapter 250 to the base connecting device 160, retaining arms 322, 324 and 326, 328 (FIG. 4) are provided on the wall elements 337, 338, respectively.

The function adapter 280 is designed by way of example in the manner of a sled and has a support element 336, on which two lateral, runner-like wall elements 334, 335 are provided. Sliding elements 382, 384 (FIG. 5) and 386, 388 (FIG. 5) are formed on said runner-like wall elements 334, 335, respectively. Said sliding elements are preferably formed with a substantially identical shaping to the guide elements 352, 354, 356, 358. Accordingly, the sliding elements 382, 386 and 384, 388 (FIG. 5) are at least partially three-dimensionally curved, are preferably inclined discontinuously and are preferably at least partially of elongated S-shaped design.

Figure 4:
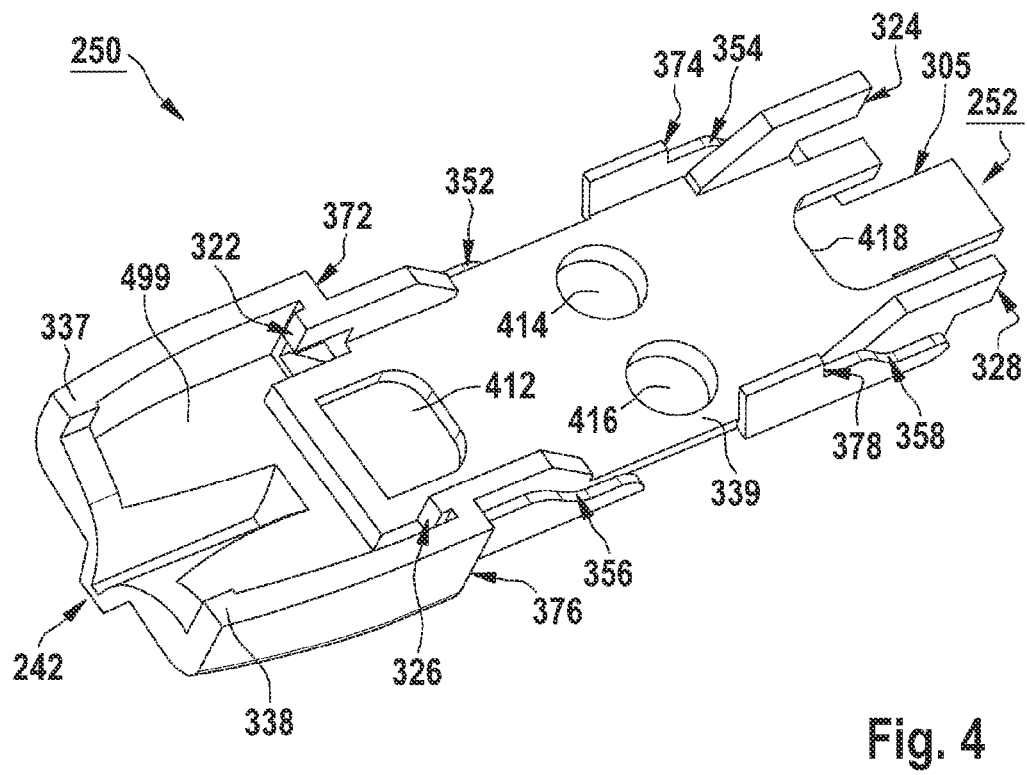
FIG. 4 shows a perspective view of a lower side of the guide adapter from FIG. 3.

FIG. 4 shows the lower side 499 of the guide adapter 250. FIG. 4 shows clearly the three-dimensional curved configuration of the guide elements 356, 358, the associated stop members 376 and 378, respectively, the longitudinal groove 242 and the retaining arms 322, 324, 326, 328.

In the illustration, pocket-like receiving elements 412, 414, 416, 418 are formed on the lower side 499 of the guide adapter 250. Said receiving elements serve to receive the projections 392, 394, 396 and 398 formed on the base connecting device 160 from FIG. 3.

Figure 5:
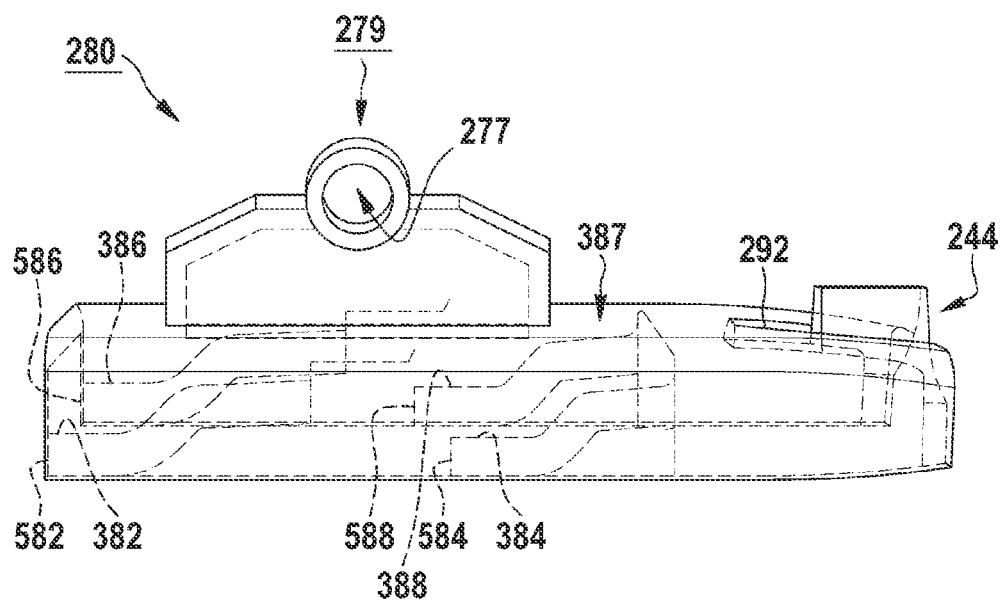
FIG. 5 shows a perspective, partially transparent view of the function adapter from FIG. 3.

FIG. 5 shows the function adapter 280 from FIG. 3 with the longitudinal groove 244, the cutout 292, the bearing element 279 and the sliding elements 382, 384, 386, 388. As described above, the latter are at least partially of three-dimensionally curved design and, in the illustration here, are at least partially in the shape of an elongated S.

The sliding elements 382, 384, 386, 388 have, for example, assigned stop members 582, 584, 586 and 588, respectively. The latter interact with the blocking members 372, 374, 376, 378 (FIG. 4) of the guide adapter 250 from FIG. 4 in order at least to limit a displacement of the function adapter 280 relative to the guide adapter 250 from FIG. 4.

Figure 6:
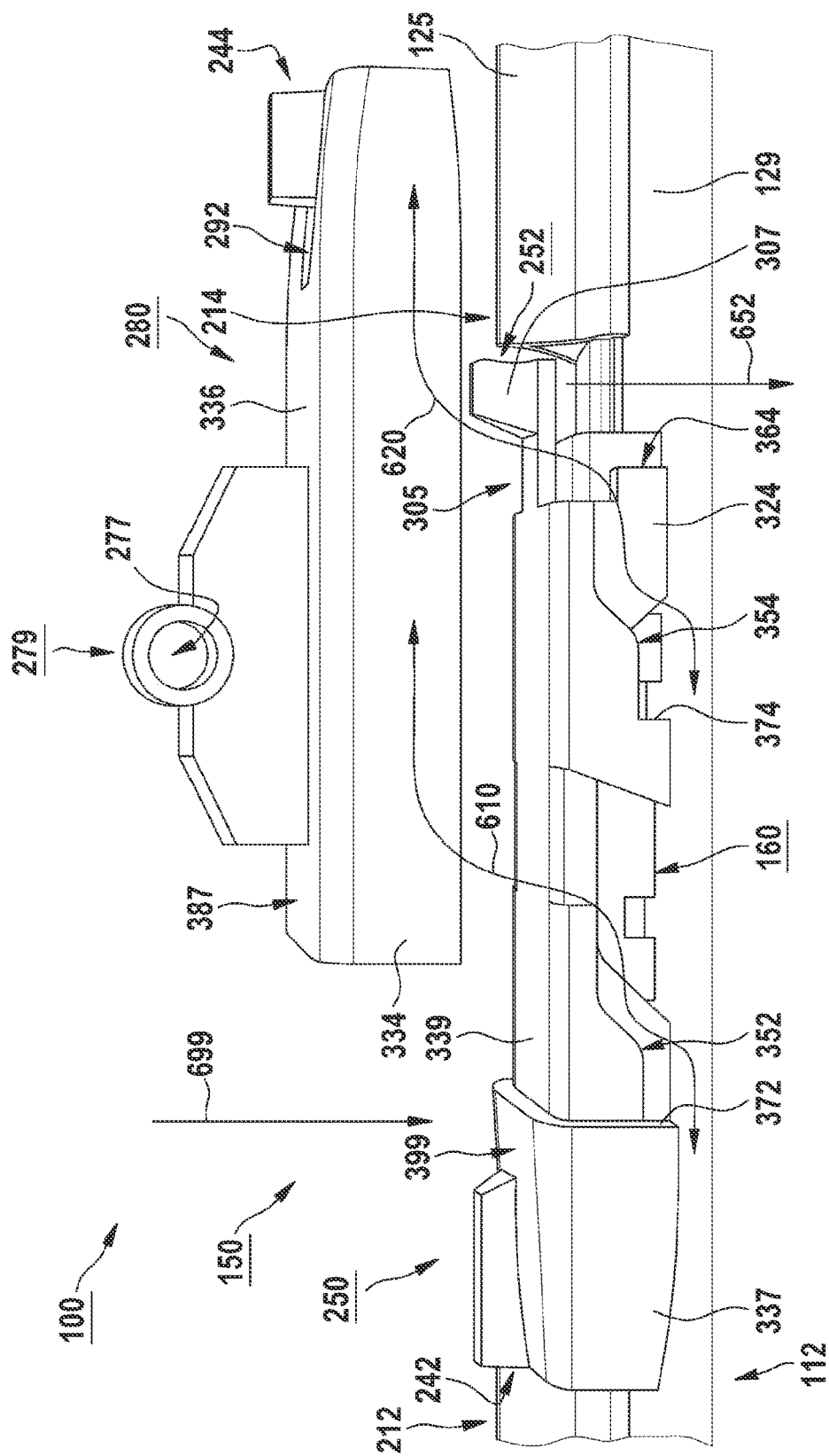
FIG. 6 shows a perspective view of the wiper blade detail from FIG. 2 during installation of the adapter unit from FIG. 3.

FIG. 6 shows the wiper blade detail from FIGS. 2 and 3 during installation of the adapter unit 150 on the base connecting device 160. For this purpose, in a first step, the guide adapter 250 is pressed or pushed in the direction of an arrow 699 onto the device 160. The retaining arms 322, 324, 326, 328 (FIG. 4) of the guide adapter 250 are initially elastically deformed in the process from an initial shape until said retaining arms engage in the associated retaining indentations 362, 364, 366, 368 (FIG. 3) of the base connecting device 160. They resume their initial shape there and are therefore interlocked in the retaining indentations 362, 364, 366, 368 (FIG. 3), thus producing a permanent snap-in connection between the guide adapter 250 and the base connecting device 160. At the same time, the projections 392, 394, 396, 398 (FIG. 3) of the base connecting device 160 engage in the pocket-like receiving elements 412, 414, 416, 418 (FIG. 4) of the guide adapter 250 such that the latter is aligned in a slip-free and precise manner on the base connecting device 160. Furthermore, the end region 212 of the spoiler 125 is now received in the longitudinal groove 242 of the guide adapter 250 while the end region 214 of said spoiler is still exposed.

In a second step, the function adapter 280 is positioned in the direction of the arrow 699 on the guide adapter 250 in such a manner that the sliding elements 382, 384, 386, 388 (FIG. 5) are arranged in the region of the guide elements 352, 354, 356, 358 (FIG. 4). The function adapter 280 is then moved in the direction of arrows 610, 620 relative to the guide adapter 250 by a combined translational and rotational movement in such a manner that the sliding elements 382, 384, 386, 388 (FIG. 5) are displaced in a manner sliding along the guide elements 352, 354, 356, 358. The function adapter 280 is displaced in the process in the manner of a sled from a release position, which is illustrated in FIG. 6, into a retaining position, which is illustrated in FIG. 2 and in which the stop members 382, 384, 386, 388 (FIG. 5) of the function adapter 280 are blocked by the blocking members 372, 374, 376, 378 (FIG. 4) of the guide adapter 250.

During the displacement of the function adapter 280 from the release position into the retaining position, the actuable latching element 252 is initially deformed elastically in the direction of an arrow 652. In the process, by the function adapter 280 pressing against the latching cam 307, the latching tongue 305 is deflected resiliently in the direction of the arrow 652 from an initial position. When the retaining position of the function adapter 280 is reached, the latching tongue 305 springs back again into the initial position thereof, i.e. in the opposite direction to the arrow 652, and the latching cam 307 reaches through the cutout 292 in the function adapter 280 and latches releasably there, as shown in FIG. 2. The latching cam 307 now prevents a reversing movement of the function adapter 280 in the direction of the arrows 610, 620. Furthermore, the end region 214 of the spoiler 125 is now held in the longitudinal groove 244 of the function adapter 280.

As described above for FIG. 2, the latching element 252 of the guide adapter 250 is latched releasably to the function adapter 280. Said releasable latching can be released by actuation of the latching element 252. For this purpose, the latching cam 307 has to be pressed out of the cutout 292 in the direction of the arrow 652 in order to permit a sliding displacement of the function adapter 280 relative to the guide adapter 250 along the arrows 610, 620 from the retaining position into the release position.

Figure 7:
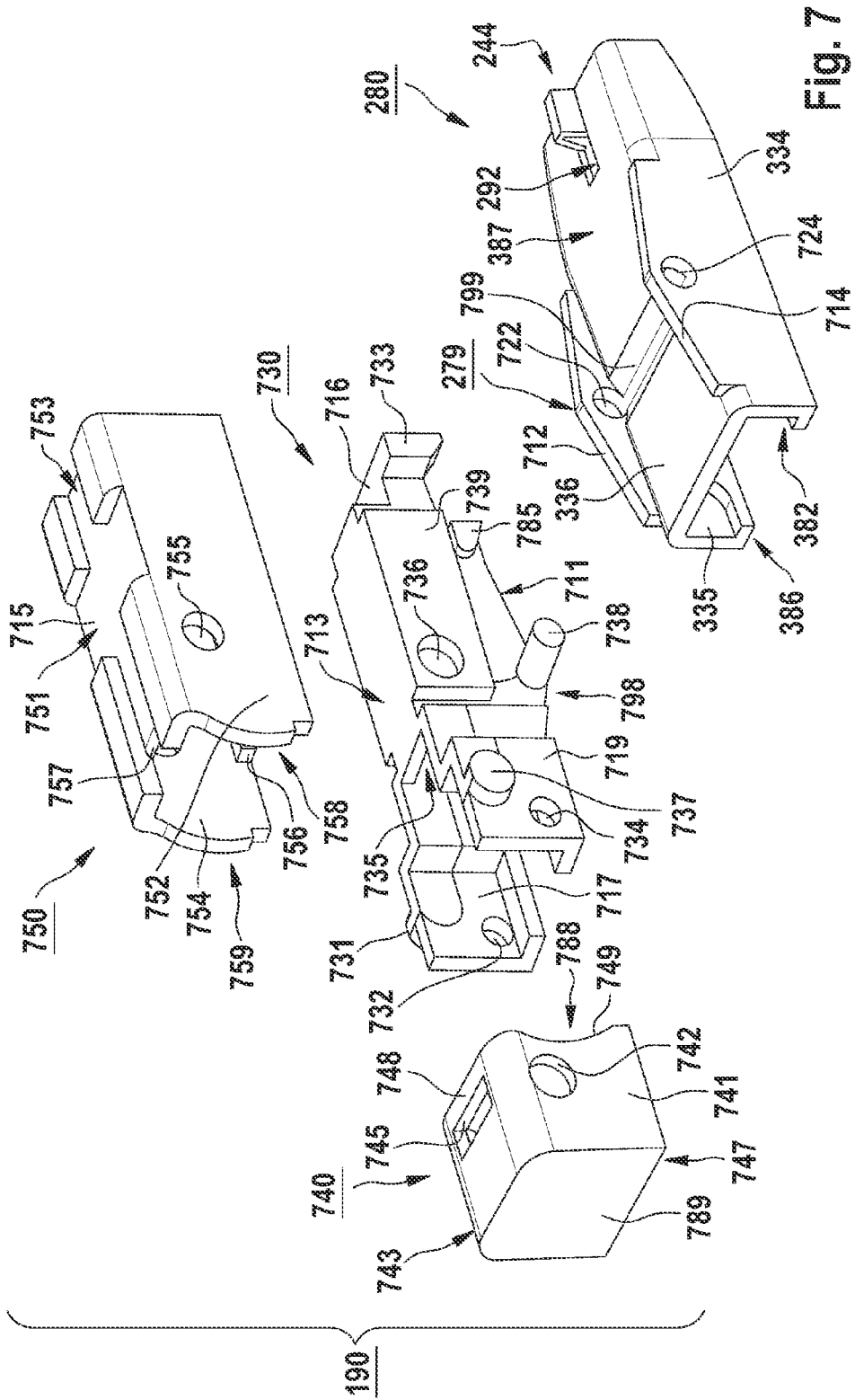
FIG. 7 shows a perspective view of the connecting member from FIG. 1 according to the first embodiment.

FIG. 7 shows the function adapter 280 from FIGS. 2 and 3 with a bearing element 279, which is designed by way of example, for connection to the connecting member 190, which is designed according to a first embodiment, from FIG. 1. In FIG. 7, the bearing element 279 has at least two wall elements 712, 714 aligned parallel to each other for at least partially laterally supporting the connecting member 190. The wall elements 712, 714 are provided with, for example, circular openings 722, 724, between which a pocket-like recess 799, which is provided on the support element 336, is formed.

The connecting member 190 has, by way of example, a base element 730 which can be mounted on the function adapter 280 and can be connected to a cover member 740 and an adapter element 750. The base element 730 can be fastened to the function adapter 280 preferably via a snap-in connection and is therefore also referred to below as the "fastening member". According to an embodiment, the fastening member 730, the cover member 740 and the adapter element 750 are produced from plastic, for example by plastics injection molding. However, other production methods and materials or combinations of materials may also be used.

The fastening member 730 is designed by way of example for attachment to a first multiplicity of different wiper arm types, as described below for FIGS. 10 and 11. The adapter element 750 is designed by way of example for attachment to a second multiplicity of different wiper arm types which differ from the wiper arm types of the first multiplicity of wiper arm types, as described below for FIGS. 12 and 13. The cover member 740 is designed by way of example for fixing different wiper arm types to the fastening member 730 or to the adapter element 750.

According to an embodiment, a bearing member 798 having a shaping, which corresponds, by way of example, to the shaping of the pocket-like recess 799, is provided on a lower side 711 of the fastening member 730. The bearing member 798 has a shaft 738 which is designed for receiving in the circular openings 722, 724. As an alternative thereto, instead of a continuous shaft 738, it is also possible for two pin-shaped or cylindrical lateral projections to be formed on the fastening member 730. Lateral blocking elements, of which only the blocking element 785 is visible in FIG. 7, are formed on an axial end region of the bearing member 798.

The bearing member 798 is integrally formed on a support block 739, which is at least partially designed as a hollow profile and has a cavity 735 which has a passage opening or bore 736 and a preferably flat upper side 713. Lateral blocking elements 733 and 793 (FIG. 8) are formed on that axial end region of the support block 739 which is on the right in FIG. 7, said blocking elements being integrally formed on the support block 739, for example, via a T-shaped elongation 716. Lateral connecting elements 717, 719, which are L-shaped, for example, are integrally formed on that axial end region of the support block 739 which is on the left in FIG. 7. Said connecting elements respectively have a circular opening 732 and 734 and a pin-like projection 731 and 737 for connection to the cover member 740.

The cover member 740 is designed by way of example in the manner of a cuboidal hood, with an upper wall element 748 and side walls 741, 743 which are connected to each other via a terminating wall 789. The sides 747 and 788, which are opposite the upper wall element 748 and the terminating wall 789, are open. An opening 745 is provided in the upper wall element 748. Openings 742 and 744 (FIG. 8) for receiving the projections 737 and 731 during fastening of the cover member 740 to the fastening member 730 are provided in the side walls 741, 743, respectively. Those end regions 749 of the side walls 741, 743 which face the open side 788 are shaped concavely in the illustration. According to an embodiment, the cover member 740 is designed for fixing the adapter element 750 to the fastening member 730.

The adapter element 750 is designed by way of example as a hollow or U-profile with a top element 715, on which two lateral wall elements 752, 754 are integrally formed, on which, in turn, respective retaining webs 758 and 756 are provided. The top element 715 is provided with a longitudinal groove 753 and a transverse groove 751. The wall elements 752, 754 have preferably circular openings, of which only the opening 755 provided in the wall element 752 can be seen in FIG. 7. According to an embodiment, the wall elements 752, 754 are shaped convexly on their end regions 759, which, following installation on the fastening member 730, face the cover member 740, in such a manner that said end regions 759 and the end regions 749 of the side walls 741, 743 of the cover member 740 intermesh in a form-fitting manner. Furthermore, the end regions 759 of the wall elements 752, 754 protrude relative to an end region 757 of the top element 715 such that, after the installation, a clearance (1210 in FIG. 12) is formed between the top element 715 and the upper wall element 748 of the cover member 740.

Figure 8:
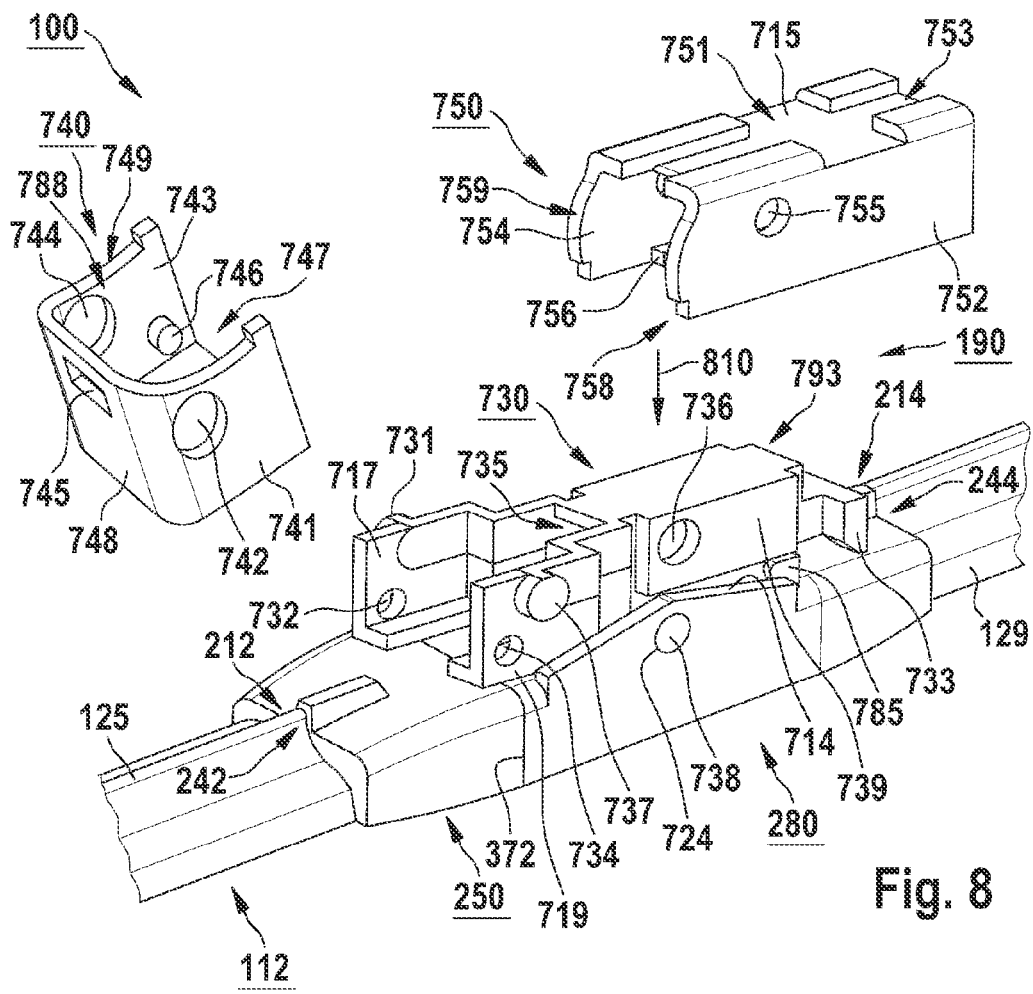
FIG. 8 shows a perspective view of the wiper blade detail from FIG. 2 during installation of the connecting member from FIG. 7.

FIG. 8 shows the wiper blade detail from FIG. 2 during the installation of the connecting member 190 from FIG. 7 on the function adapter 280, which is connected releasably to the guide adapter 250 from FIG. 2, according to the configuration shown in FIG. 7. In this case, the fastening member 730 is initially fastened to the function adapter 280, for example, by a snap-in connection. For this purpose, the fastening member 730 is pushed onto the function adapter 280 in the direction of an arrow 810, wherein the wall elements 714 and 712 thereof (FIG. 7) are elastically deformed laterally outward from an initial position until the bearing member 798 (FIG. 7) is arranged in the pocket-like recess 799 (FIG. 7) of the function adapter 280 and the shaft 738 is arranged in the region of the openings 724 and 722 (FIG. 7). The wall elements 712, 714 now move back into the initial position thereof such that the axial ends of the shaft 738 are received in the openings 722, 724 and therefore a snap-in connection is produced between the fastening member 730 and function adapter 280, in which lateral slipping of the fastening member 730 is prevented by the wall elements 712, 714.

In a next step, the cover member 740 can be fastened rotatably to the fastening member 730, preferably via a snap-in connection. For this purpose, the cover member 740 is pushed, for example, in the direction of the arrow 810 onto the connecting elements 717, 719 of said fastening member, the connecting elements moving elastically toward each other in the process from an initial position until pin-shaped shaft elements, which are formed on the side walls 741, 743 of the cover member 740 and of which only the shaft element 746 which is formed on the side wall 743 is visible in FIG. 8, engage in the openings 732, 734 provided on the fastening member 730.

In a further step, the adapter element 750 can now be pushed, for example in the direction of the arrow 810, onto the fastening member 730. This is described below for FIG. 12.

Figure 9:
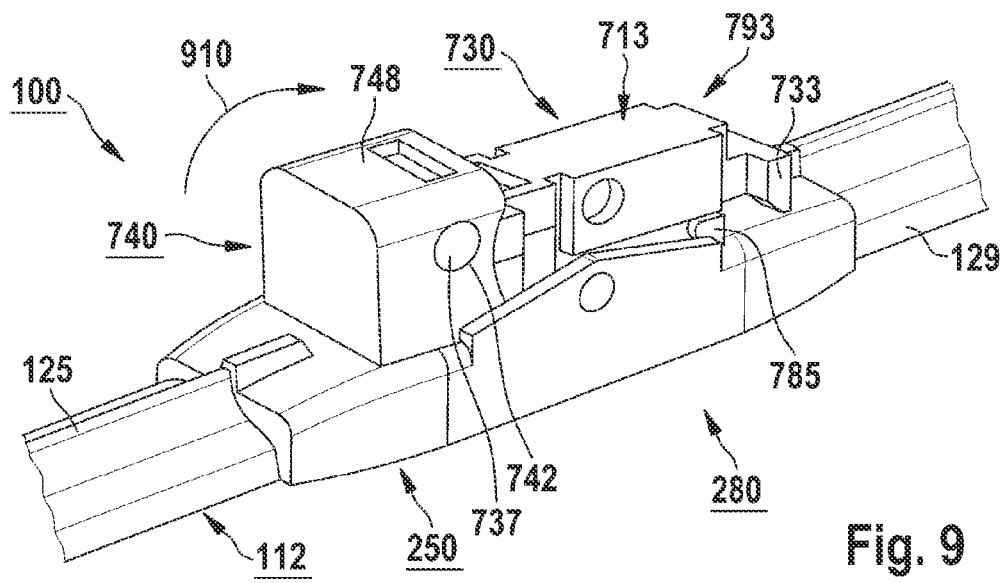
FIG. 9 shows a perspective view of the wiper blade detail from FIG. 2 with the connecting member from FIG. 7 in the fitted state.

FIG. 9 shows the arrangement from FIG. 8 without the adapter element 750, in which arrangement the cover member 740 is latched releasably to the fastening member 730 by means of the projections 737 and 731 (FIG. 8) engaging in the openings 742, 744, respectively, (FIG. 8), preferably by means of a snap-in connection. For this purpose, in order to produce the snap-in connection, the cover member 740 is rotated from the position thereof which is shown in FIG. 8 in the direction of an arrow 910 toward the fastening member 730 in order to latch there.

Figure 10:
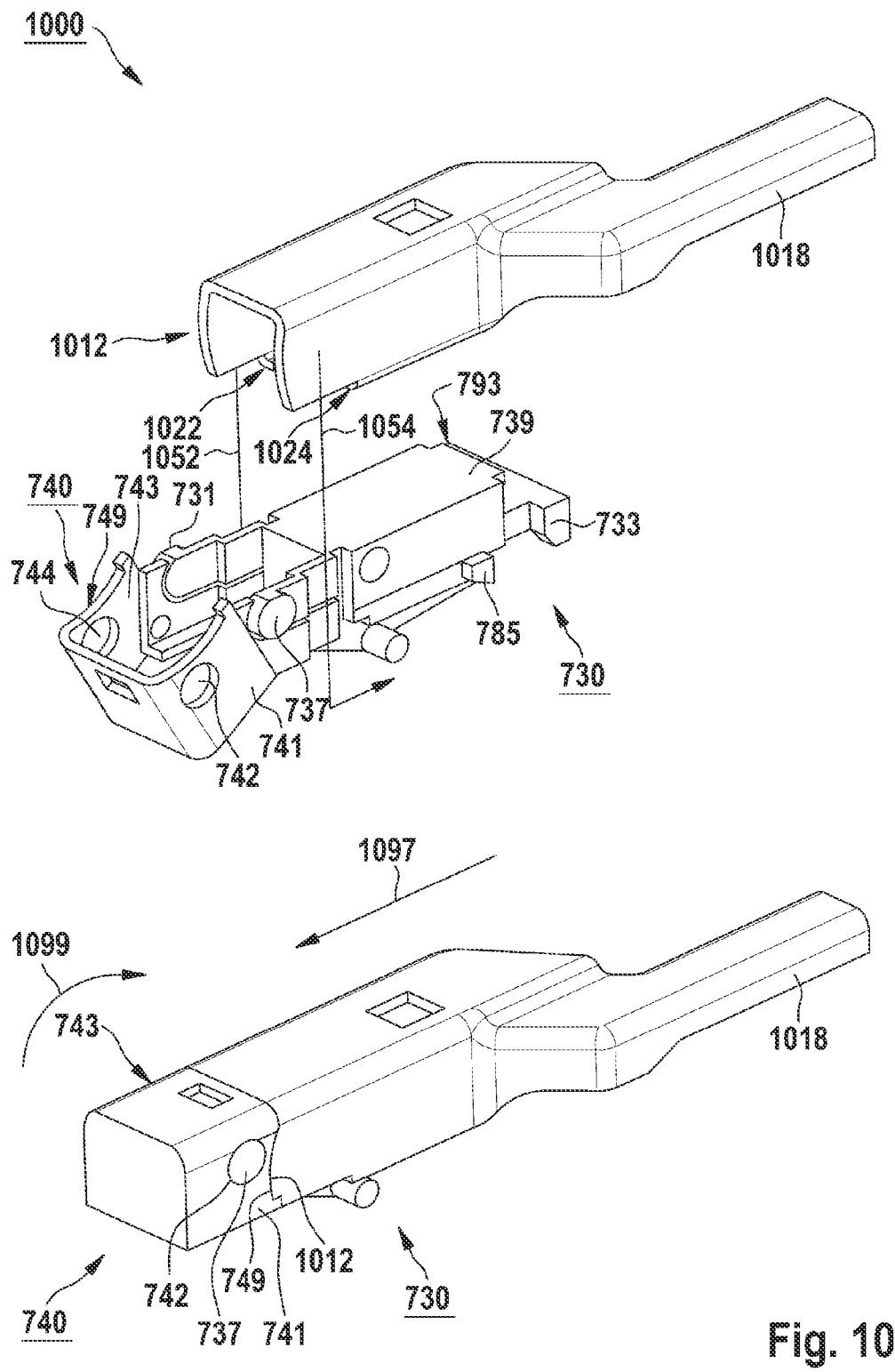
FIG. 10 shows a perspective view of the connecting member from FIG. 7 during attachment to a first wiper arm type.

FIG. 10 shows an arrangement 1000 in which, by way of example, a wiper arm 1018, representing the wiper arm 118 from FIG. 1, of the "Top-Lock2" wiper arm type is attached to the fastening member 730, which is connected to the cover member 740. In the illustration, the wiper arm 1018 has retaining rails 1022, 1024 directed inward. In order to simplify the illustration, only the wiper arm 1018, the fastening member 730 and the cover member 740 are shown in FIG. 10.

The wiper arm 1018 is pushed in the direction of arrows 1052, 1054 onto the fastening member 730 until the lateral blocking elements 785 thereof block the retaining rails 1022, 1024 of the wiper arm 1018 and therefore prevent further displacement of the wiper arm 1018 in the direction of the arrows 1052, 1054. Then, as described for FIG. 9, the cover member 740 is rotated in the direction of an arrow 1099 toward the fastening member 730 in order to latch there. In this case, a form-fitting connection between the concave end regions 749 of the side walls 741, 743 of the cover member 740 and correspondingly convexly shaped end regions 1012 of the wiper arm 1018 is preferably produced, and therefore the wiper arm 1018 is prevented from slipping in the opposite direction to the arrows 1052, 1054, i.e. in the direction of an arrow 1097.

FIG. 11 shows an arrangement 1100, in which, by way of example, a wiper arm 1118, representing the wiper arm 118 from FIG. 1, of the "Valeo Top-Lock2" wiper arm type is attached to the fastening member 730, which is connected to the cover member 740. In the illustration, the wiper arm 1118 has an elongate connecting component 1111 on which a retaining tongue 1112 having an opening 1114, and lateral retaining shoulders 1116 and 1117 are integrally formed. To simplify the illustration, FIG. 11 likewise only shows the wiper arm 1118, the fastening member 730 and the cover member 740.

The wiper arm 1118 is pushed in the direction of arrows 1152, 1154 onto the fastening member 730 until the lateral blocking elements 733, 793 thereof block the retaining shoulders 1116, 1117 of the wiper arm 1118 and therefore prevent further displacement of the wiper arm 1118 in the direction of the arrows 1152, 1154. Then, as described for FIG. 9, the cover member 740 is rotated in the direction of an arrow 1199 toward the fastening member 730 in order to latch there. A form-fitting connection between the concave end regions 749 of the side walls 741, 743 of the cover member 740 and corresponding end regions 1115 of the wiper arm 1118 is preferably produced in this case, and therefore the wiper arm 1118 is prevented from slipping in a direction opposite to the arrows 1152, 1154, i.e. in the direction of an arrow 1197.

Figure 12:
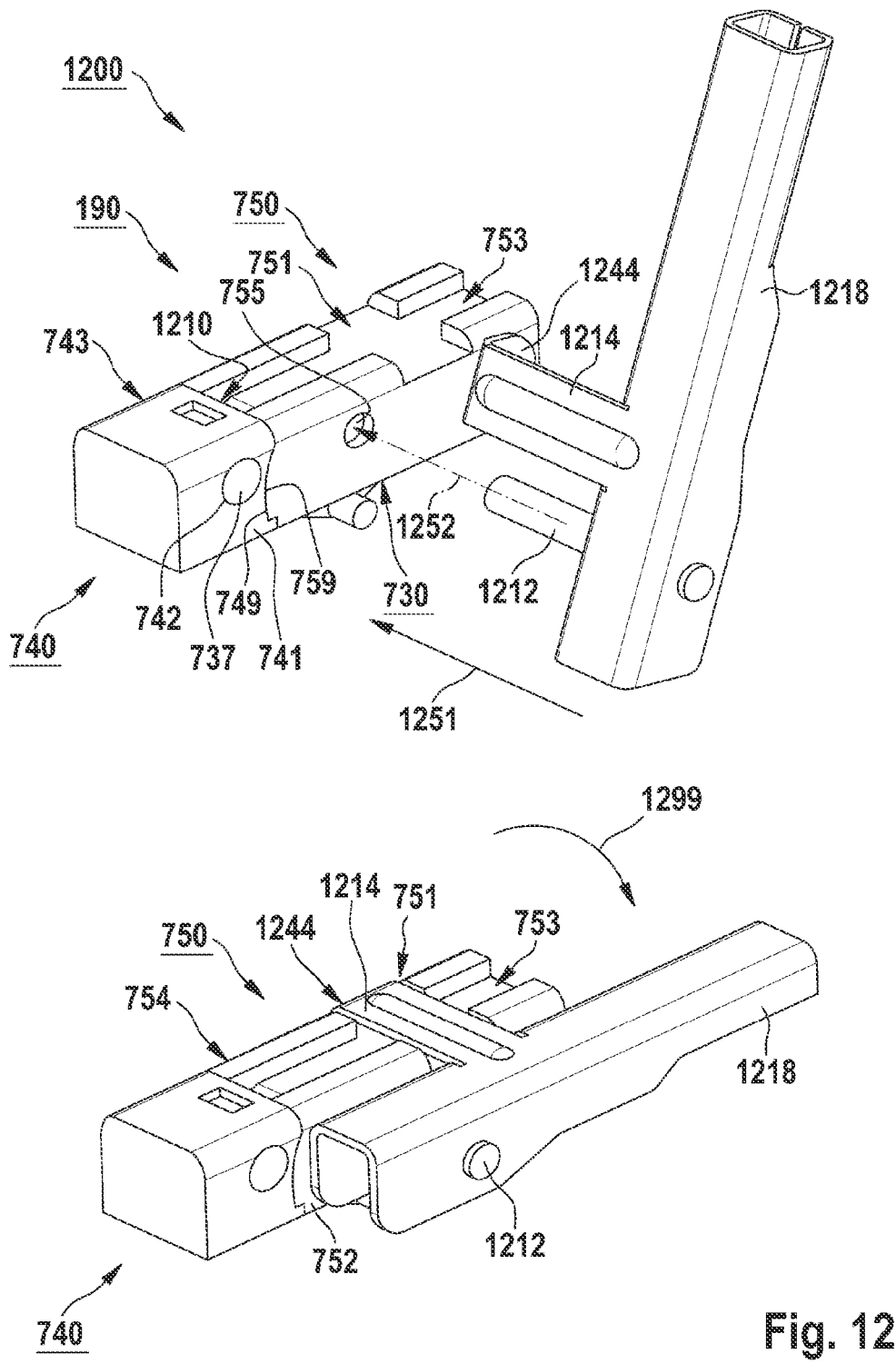
FIG. 12 shows a perspective view of the connecting member from FIG. 7 during attachment to a third wiper arm type.

FIG. 12 shows an arrangement 1200, in which, by way of example, a wiper arm 1218, representing the wiper arm 118 from FIG. 1, of the "Side-Lock1" wiper arm type is attached to the fastening member 730, which is connected to the cover member 740 and to which the adapter element 750 is fastened. To simplify the illustration, FIG. 12 shows only the wiper arm 1218, the fastening member 730, the cover member 740 and the adapter element 750.

For the fastening to the fastening member 730, the adapter element 750 is pushed onto the latter, for example in the direction of the arrow 810 from FIG. 8, thus producing a snap-in connection between said components, in which the adapter element 750 engages around at least part of the fastening member 730 in the manner of a cap and/or claw. Said snap-in connection is brought about by the retaining webs 758, 756 (FIG. 7), which are provided on the adapter element 750, reaching under the support block 739 of the fastening member 730 and being prevented there, preferably by the lateral blocking elements 785 of said support block (FIG. 7), from being displaced axially to the right—in FIG. 12. An axial displacement of the adapter element 750 to the left—in FIG. 12—is prevented by the latched cover member 740, as described for FIG. 9, since the concave end regions 749 of the side walls 741, 743 thereof bear in a form-fitting manner against the convex end regions 759 of the adapter element 750.

In the illustration, the wiper arm 1218 has a rotary shaft 1212 and a retaining bracket 1214 and is pushed in the direction of an arrow 1251 onto the connecting member 190 in such a manner that the rotary shaft 1212 is passed through the openings 755, 736 (FIG. 7) in the adapter element 750 and in the fastening member 730, respectively, as indicated by a chain-dotted arrow 1252. The retaining bracket 1214 in FIG. 12 is positioned in the process above the adapter element 750.

The wiper arm 1218 is then rotated in the direction of an arrow 1299 toward the connecting member 190 such that the retaining bracket 1214 is received in the transverse groove 751 of the adapter element 750. In the process, a retaining hook 1244 provided on the retaining bracket 1214—in FIG. 12—reaches behind the lateral wall element 754 of the adapter holder 750 while the wiper arm 1218 bears against the lateral wall element 752, thus preventing the rotary shaft 1212 from slipping out of the connecting member 190.

FIG. 13 shows an arrangement 1300, in which, by way of example, a wiper arm 1318, representing the wiper arm 118 from FIG. 1, of the "9×3 hook" or "9×4 hook" wiper arm type is attached to the fastening member 730, which is connected to the cover member 740 and to which the adapter element 750 is fastened, as described for FIG. 12. To simplify the illustration, FIG. 13 only shows the wiper arm 1318, the fastening member 730, the cover member 740 and the adapter element 750.

In the illustration, the wiper arm 1318 is of hook-shaped design and has an elongate connecting component 1316 on which a hook 1312 is integrally formed via a curved element 1314. For the fastening to the connecting member 190, the wiper arm 1318 is positioned on the latter in the direction of an arrow 1351 in such a manner that the elongate connecting component 1316 is arranged in the longitudinal groove 753 and the curved element 1314 with the hook 1312 engages into at least part of the cover member 740 via the open side 788 of said cover member 740. The wiper arm 1318 is then displaced in the direction of an arrow 1352 such that the hook 1312 is introduced into the cavity 735 of the support block 739 of the fastening member 730 until the curved element 1314 bears against the end region 757 of the top element 715 of said fastening member.

The cover member 740 is then rotated, as described for FIG. 9, in the direction of an arrow 1399 toward the fastening member 730 in order to latch there. The curved element 1314 is therefore blocked in the clearance 1210, thus preventing the wiper arm 1318 from slipping out in a direction opposite to the arrow 1352.

Figure 14:
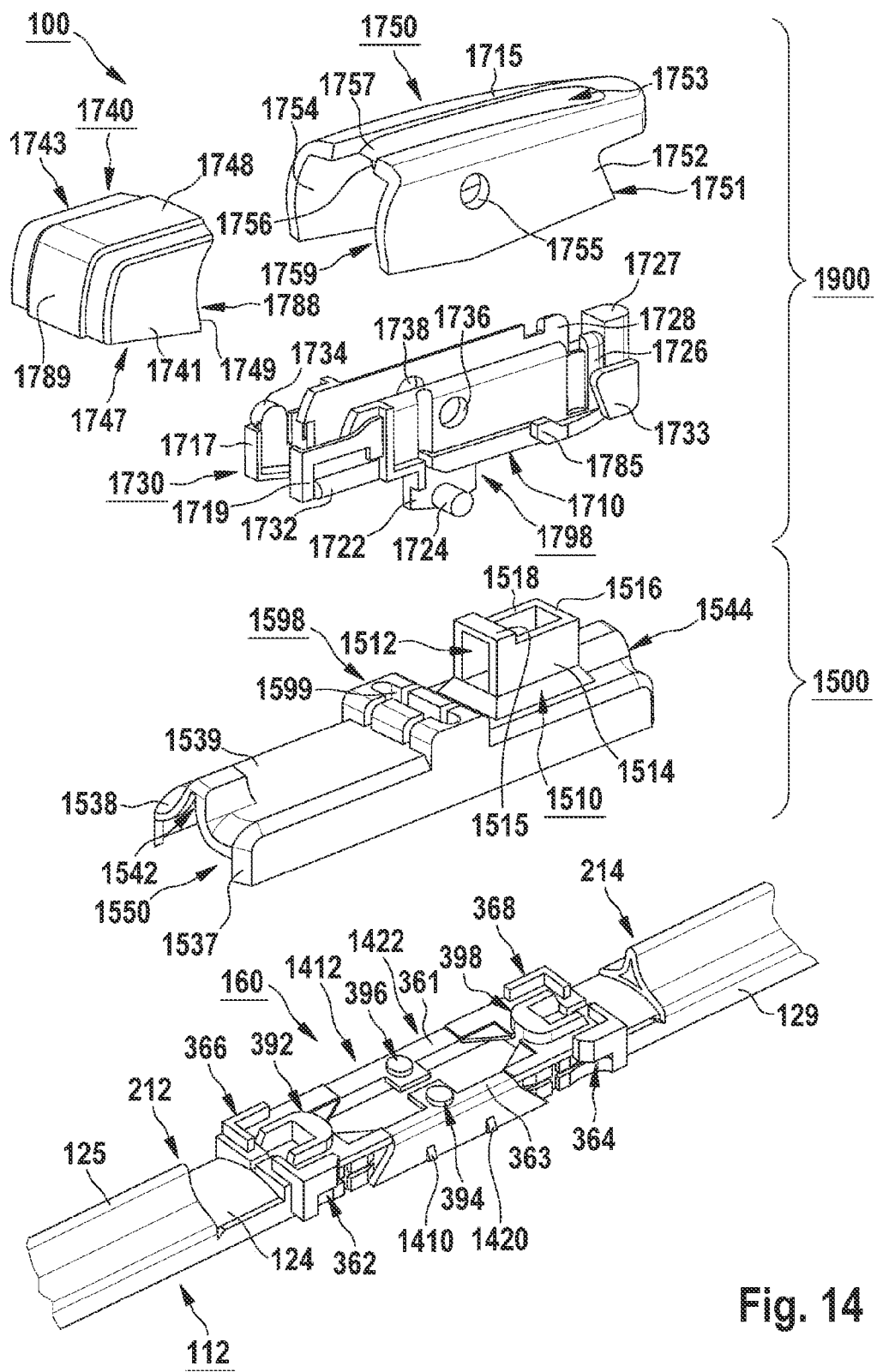
FIG. 14 shows a perspective view of a detail II of the wiper blade from FIG. 1, with the wiper strip provided with the base connecting device, and with an adapter unit and a connecting member according to a second embodiment, in the unfitted state.

FIG. 14 shows a detail of the wiper blade 100 from FIG. 1 with an adapter unit 1500 and a connecting member 1900 according to a further embodiment. The adapter unit 1500 is preferably designed for permanently fastening to the base connecting device 160, which is connected to the wiper strip 112. The wiper strip 112 and the base connecting device 160 are constructed as described above for FIGS. 1 to 3, and therefore, in order to keep the description concise, a repeated description is omitted here.

In contrast to the adapter unit 150 described for FIGS. 2 to 13, the adapter unit 1500 is preferably formed as a single piece and, for example, from plastic. However, it is pointed out that other materials may also be used. The adapter unit 1500 is configured, by way of example, with a shaping in the manner of a submarine and has a top element 1539, on which two lateral wall elements 1537, 1538 are integrally formed. To permanently fasten the adapter unit 1500 to the base connecting device 160, the lower side 1550 of said adapter unit and the mutually facing insides of the lateral wall elements 1537, 1538 are designed, for example, in the manner of the respective lower side 499 and the wall elements 337, 338 of the guide adapter 250 from FIGS. 3 and 4. Accordingly, according to an embodiment, retaining arms are provided on the wall elements 1537, 1538, said retaining arms corresponding to the retaining arms 322, 324, 326, 328 from FIGS. 3 and 4, and pocket-like receiving elements, which correspond to the receiving elements 412, 414, 416, 418 from FIG. 4, are formed on the lower side 1550.

However, it is pointed out that other types of fastening for permanently fastening the adapter unit 1500 to the base connecting device 160 are also possible. For example, latching hooks can be provided on the lower side 1550 of the adapter unit 1500, which latching hooks can be latched to latching lugs 1410, 1420, 1412, 1422, which, in the illustration, are formed on the base connecting device 160.

By way of example, a bearing element 1598, on which the connecting member 1900 can be mounted, is formed on the top element 1539 of the adapter unit 1550. The bearing element 1598 has, by way of example, a pocket-like bearing receptacle 1599. However, it is pointed out that the bearing element 1598 with the receptacle 1599 is merely depicted by way of example in FIG. 14 and not to restrict the invention. On the contrary, the bearing element 1598 may have a multiplicity of different configurations which may be dependent on a configuration of the connecting member 1900. For example, the bearing element 1598 can be designed in the manner of the bearing element 279 from FIG. 2.

A receiving groove 1542 for receiving a first end region 212 of the spoiler 125 of the wiper blade 100 is formed at least in regions of an axial end region of the adapter unit 1500, which end region is shown on the left in FIG. 14. A receiving groove 1544 for receiving a second end region 214 of the spoiler 125 is formed at least in regions of the axial end region of said adapter unit which is shown on the right in FIG. 2.

Furthermore, according to an embodiment, a tower-like guide and positioning member 1510 for the simplified alignment of the connecting member 1900 on the adapter unit 1500 is formed on the top element 1539, said guide and positioning member having two wall elements 1514, 1518 which are connected to each other via a terminating wall 1516 and a support part 1515. The support part 1515 can cover only part of the guide and positioning member 1510, as shown in FIG. 14, or else can cover the latter completely. A side surface 1512 of the guide and positioning member 1510, which side surface is opposite the terminating wall 1516, is open.

The connecting member 1900 has, by way of example, a base element 1730 which can be mounted on the adapter unit 1500 and can be connected to a cover member 1740 and to an adapter element 1750. The base element 1730 can be fastened to the adapter unit 1500, preferably via a snap-in connection, and is therefore also referred to below as the "fastening member". According to an embodiment, the fastening member 1730, the cover member 1740 and the adapter element 1750 are produced from plastic, for example by plastic injection molding. However, other production methods and materials and combinations of materials may also be used.

The fastening member 1730 is designed, by way of example, for attachment to a first multiplicity of different wiper arm types, as described below for FIGS. 16 to 18. The adapter element 1750 is designed, by way of example, for attachment to a second multiplicity of different wiper arm types which at least partially differ from the wiper arm types of the first multiplicity of wiper arm types, as described below for FIGS. 18 to 20. The cover member 1740 is designed, by way of example, for fixing different wiper arm types to the fastening member 1730 or to the adapter element 1750.

According to an embodiment, a bearing member 1798 with a shaping, which corresponds, for example, to the shaping of the pocket-like bearing receptacle 1599, is provided on a lower side 1710 of the fastening member 1730 in order, for example, to permit the production of the snap-in connection between said components. The bearing member 1798 has a shaft 1724 which is preferably designed for latching in the bearing receptacle 1599 and can have one or more, for example, wall-like positioning aids 1722. As an alternative thereto, instead of a continuous shaft 1724, two pin-shaped or cylindrical, lateral projections may also be formed on the fastening member 1730.

By way of example, wall elements 1726, 1728, which are provided with circular openings 1736 and 1738, respectively, are integrally formed on the bearing member 1798. Between the wall elements 1726, 1728, an aperture 1710 is formed in the bearing member 1798, the dimensions of which aperture correspond to the dimensions of the tower-like guide and positioning member 1510 so that the latter can be passed through the aperture 1710.

Lateral blocking members 1733 and 1793 (FIGS. 16 to 20) and an illustrated positioning pin or knob 1727, and also lateral blocking members 1785 and 1786 (FIG. 17) are formed on that axial end region of the wall elements 1726, 1728, respectively, which is on the right in FIG. 14. Lateral connecting members 1719 and 1717 are integrally formed on that axial end region of the wall elements 1726, 1728, respectively, which is on the left in FIG. 14. The connecting member 1719 has, by way of example, a bearing shaft 1732 for the rotatable mounting of the cover member 1740. In the illustration, a latching stud 1734 for the releasable latching of the cover member 1740 is provided on the connecting member 1717.

The cover member 1740 is designed, by way of example, in the manner of a cuboidal hood, with an upper wall element 1748 and side walls 1741, 1743, which are connected to each other via a terminating wall 1789. The sides 1747 and 1788 opposite the upper wall element 1748 and the terminating wall 1789, respectively, are open. In the illustration, those end regions 1749 of the side walls 1741, 1743 which face the open side 1788 are shaped concavely. According to an embodiment, the cover member 1740 is designed for fixing the adapter element 1750 to the fastening member 1730.

The adapter element 1750 is designed, by way of example, as a hollow or U profile with a top element 1715, on which two lateral wall elements 1752, 1754 are integrally formed. The top element 1715 is formed at least with a longitudinal groove 1753, but, like the adapter element 750 from FIG. 7, may also be provided with a transverse groove (751 in FIG. 7). The wall elements 1752, 1754 preferably have circular openings 1755 and 1756, respectively.

Lateral stop elements 1751 and 1758 (FIGS. 18 to 20) are formed on the axial end regions of the wall elements 1752, 1754, respectively, which are on the right in FIG. 14. On the axial end regions 1759 thereof which are on the left in FIG. 14, the wall elements 1752, 1754, according to an embodiment, are shaped convexly in such a manner that said end regions 1759 and the end regions 1749 of the side walls 1741, 1743 of the cover member 1740 intermesh in a form-fitting manner. Furthermore, the end regions 1759 of the wall elements 1752, 1754 protrude relative to an end region 1757 of the top element 1715 such that, following installation, a clearance (1888 in FIG. 18) is formed between the top element 1715 and the upper wall element 1748 of the cover member 1740.

Figure 15:
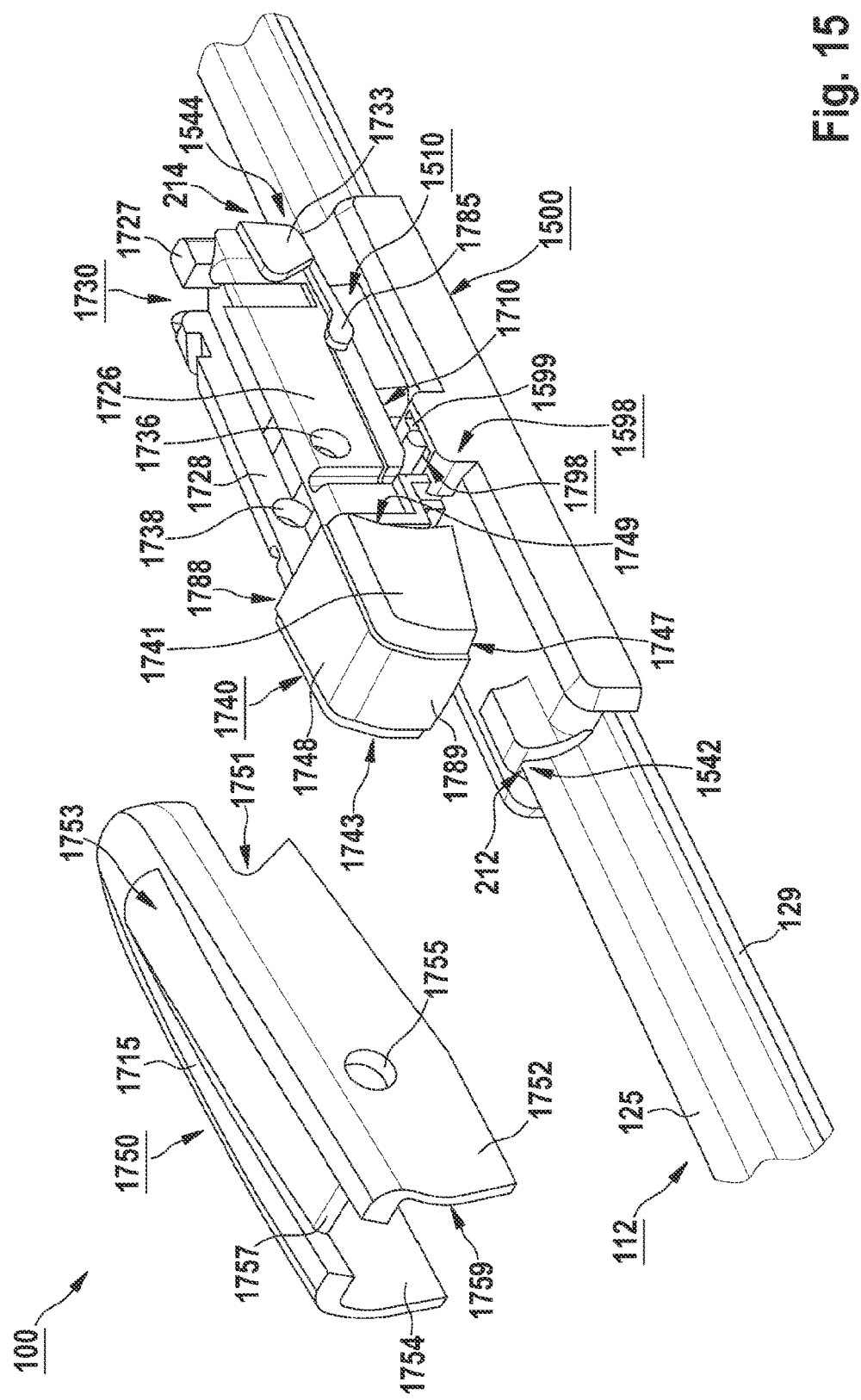
FIG. 15 shows a perspective view of the wiper blade detail from FIG. 14 during installation of the connecting member.

FIG. 15 shows the wiper blade detail from FIG. 14 during the installation of the connecting member 1900 on the adapter unit 1500, which is permanently connected to the base connecting device 160. In this case, the fastening member 1730 is first of all pushed onto the adapter unit 1500, in order to fasten said components to one another, wherein the bearing member 1798 is arranged and fixed in the pocket-like bearing receptacle 1599 (FIG. 14). By means of the configuration of the bearing element 1598 that is shown in FIG. 14, lateral slipping of the fastening member 1730 can be prevented.

In a next step, the cover member 1740 can be fastened rotatably to the fastening member 1730, preferably via a snap-in connection, as described by way of example below for FIG. 16. The adapter element 1750 can then be pushed onto the fastening member 1730, as described by way of example below for FIG. 18.

FIG. 16 shows an arrangement 1600, in which, by way of example, the wiper arm 1118, representing the wiper arm 118 from FIG. 1, of the "Valeo Top-Lock2" wiper arm type from FIG. 11 is attached to the fastening member 1730, which is connected to the cover member 1740. According to an embodiment, the cover member 1740 has claw-like fixing elements 1745 which can preferably be latched by means of a snap-in connection to the bearing shaft 1732 of the fastening member 1730 in such a manner that the cover member 1740 can be rotated about the bearing shaft 1732, wherein the axis of rotation defined by the bearing shaft 1732 lies approximately parallel to the axial extent of the wiper strip 112.

As FIG. 16 shows clearly, the wiper arm 1118 is first of all pushed in the direction of arrows 1651 or 1652 and 1654 onto the fastening member 1730 until the lateral blocking members 1733, 1793 thereof block the retaining shoulders 1116 (FIG. 11), 1117 of the wiper arm 1118 and therefore prevent further displacement of the wiper arm 1118 in the direction of the arrows 1652, 1654. Then, in order to produce a snap-in connection, the cover member 1740 is rotated in the direction of an arrow 1699 toward the fastening member 1730 such that the latching stud 1734 engages in an opening 1742, which is provided in the side wall 1743, in order to latch releasably there. A form-fitting connection between the concave end regions 1749 of the side walls 1741, 1743 of the cover member 1740 and corresponding end regions 1115 of the wiper arm 1118 is preferably produced in the process, thus preventing the wiper arm 1118 from slipping out in the opposite direction to the arrows 1652, 1654.

FIG. 17 shows an arrangement 1700, in which, by way of example, the wiper arm 1018, representing the wiper arm 118 from FIG. 1, of the "Top-Lock2" wiper arm type from FIG. 10 is attached to the fastening member 730, which is connected to the cover member 740. For this purpose, the wiper arm 1018 is pushed in the direction of arrows 1712, 1714 onto the fastening member 1730 until the lateral blocking elements 1785 (FIG. 14), 1786 thereof block the retaining rails 1022, 1024 of the wiper arm 1018 and therefore prevent further displacement of the wiper arm 1018 in the direction of the arrows 1712, 1714. Then, as described for FIG. 16, the cover member 1740 is rotated in the direction of an arrow 1799 toward the fastening member 1730 in order to latch there. A form-fitting connection between the concave end regions 1749 of the side walls 1741, 1743 of the cover member 1740 and correspondingly convexly shaped end regions 1012 of the wiper arm 1018 is preferably produced in the process, thus preventing the wiper arm 1018 from slipping out in a direction opposite to the arrows 1712, 1714.

FIG. 18 shows an arrangement 1800, in which, by way of example, a wiper arm 1818, representing the wiper arm 118 from FIG. 1, of the "Valeo Top-Lock3" wiper arm type is attached to the fastening member 1730, which is connected to the cover member 1740. The wiper arm 1818 has, by way of example, a longitudinal element 1816 with a positioning opening 1827 and a bent or angled end piece 1815. FIG. 18 shows clearly a clearance 1888 formed between the end region 1757 of the top element 1715 and cover member 1740.

As FIG. 18 shows, the wiper arm 1818 is first of all positioned on the fastening member 1730 and the cover member 1740 such that the end piece 1815 is arranged in the region of the connecting members 1717, 1719 and the positioning pin or knob 1727 of the fastening member 1730 at least partially engages in the positioning opening 1827 in the wiper arm 1818. The adapter element 1750 is then pushed in the direction of arrows 1852, 1854 over the wiper arm 1818 onto the fastening member 1730 until the lateral blocking members 1733, 1793 thereof block the lateral stop elements 1758 and 1751, respectively, (FIG. 14) of the adapter element 1750 and therefore prevent further displacement of the adapter element 1750 in the direction of the arrows 1852, 1854. The adapter element 1750 therefore engages around at least part of the fastening member 1730 in the manner of a cap.

Then, as described for FIG. 16, the cover member 1740 is rotated in the direction of an arrow 1899 toward the fastening member 1730 in order to latch there. A form-fitting connection between the concave end regions 1749 of the side walls 1741, 1743 of the cover member 1740 and the end regions 1759 of the adapter element 1750 is preferably produced in the process, thus preventing the wiper arm 1818 from slipping out in the direction opposite to the arrows 1852, 1854.

FIG. 19 shows an arrangement 1950, in which, by way of example, the wiper arm 1318, representing the wiper arm 118 from FIG. 1, of the "9×3 hook" or "9×4 hook" wiper arm type from FIG. 13 is attached to the fastening member 1730, which is connected to the cover member 1740 and to which the adapter element 1750 is fastened, as described for FIG. 18. For the fastening to the connecting member 1900, the wiper arm 1318 is positioned on the latter, in a similar manner as described for FIG. 13, in such a manner that the elongate connecting component 1316 is arranged in the longitudinal groove 1753, and the hook 1312 engages under the support part 1515 into the tower-like guide and positioning member 1510 from FIG. 14 such that the curved element 1314 bears against the end region 1757 of the top element 1715 from FIG. 14.

Then, as described for FIG. 16, the cover member 1740 is rotated in the direction of an arrow 1999 toward the fastening member 1730 in order to latch there. The curved element 1314 is therefore blocked in the clearance 1888, thus preventing the wiper arm 1318 from slipping out of the connecting member 1900.

Figure 20:
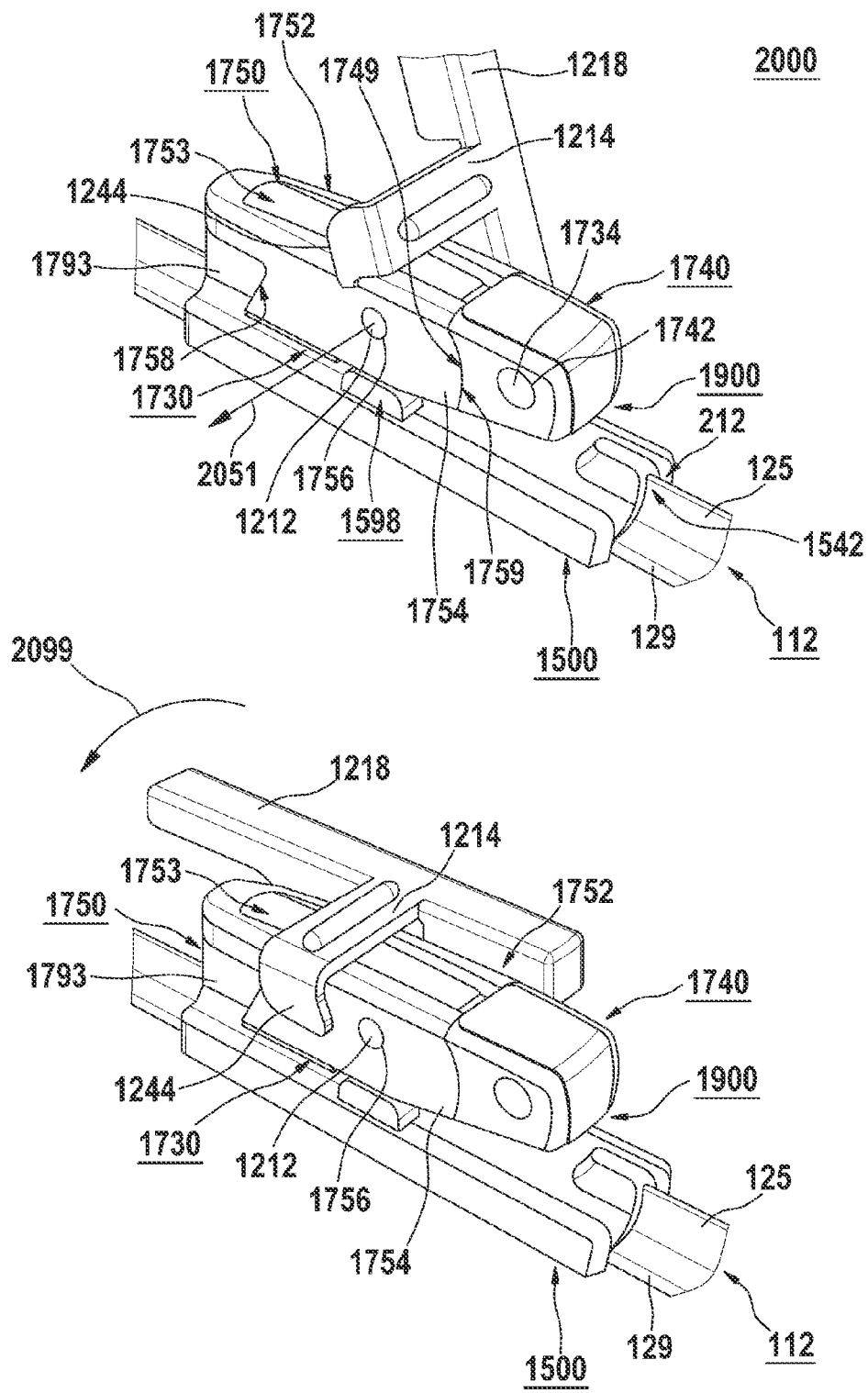
FIG. 20 shows a perspective view of the wiper blade detail from FIG. 15 with the connecting member during attachment to a fifth wiper arm type.

FIG. 20 shows an arrangement 2000, in which, by way of example, the wiper arm 1218, representing the wiper arm 118 from FIG. 1, of the "Side-Lock1" wiper arm type from FIG. 12 is attached to the fastening member 1730, which is connected to the cover member 1740 and to which the adapter element 1750 is fastened, as described for FIG. 18.

In the illustration, the wiper arm 1218 is pushed in the direction of an arrow 2051 onto the connecting member 1900 in such a manner that the rotary shaft 1212 is passed through the openings 1756, 1755 (FIG. 14) in the respective adapter element 1750 and 1738, 1736 (FIG. 15) of the fastening member 1730. In the process, the retaining bracket 1214 is positioned over the adapter element 1750 in FIG. 20.

The wiper arm 1218 is then rotated in the direction of an arrow 2099 toward the connecting member 1900 such that the retaining hook 1244 provided on the retaining bracket 1214 reaches—in FIG. 20—in front of the lateral wall element 1754 of the adapter holder 1750 while the wiper arm 1218 bears against the lateral wall element 1752, thus preventing the rotary shaft 1212 from slipping out of the connecting member 1900.

What is claimed is:

1. A wiper blade (100) for a window wiper, with a wiper strip (112) and an adapter unit (150) for attachment of the wiper strip (112) to a wiper arm (118), wherein the adapter unit (150) is fastened to a base connecting device (160) provided on the wiper strip (112) and is configured to be connected to a connecting member (190) assigned to the wiper arm (118), characterized in that the adapter unit (150) has a guide adapter (250) which is fastened permanently to the base connecting device (160) and which has guide elements (352, 354, 356, 358) which are at least partially three-dimensionally curved, which guide adapter is connected releasably to a function adapter (280) configured to be connected to the connecting member (190), which function adapter has sliding elements (382, 384, 386, 388) which are displaceable in a sliding fashion on the guide elements (352, 354, 356, 358) in such a way that the function adapter (280) is configured to be moved relative to the guide adapter (250), to move the function adapter (280) from a release position into a retaining position, wherein the movement includes at least one change in direction of the function adapter (280).

2. The wiper blade as claimed in claim 1, characterized in that the guide elements (352, 354, 356, 358) are at least partially of elongated S-shaped design.

3. The wiper blade as claimed in claim 1, characterized in that the guide elements (352, 354, 356, 358) and the sliding elements (382, 384, 386, 388) are formed with a substantially identical shaping.

4. The wiper blade as claimed in claim 1, characterized in that the guide adapter (250) has at least one actuable latching element (252) which, in the retaining position, is latched releasably to the function adapter (280), wherein latching of the latching element to the function adapter can be released by actuation of the latching element (252).

5. The wiper blade as claimed in claim 1, characterized in that the guide adapter (250) is permanently latched to the base connecting device (160) by a snap-in connection, wherein retaining arms (322, 324, 326, 328) are provided on the guide adapter (250), which retaining arms are interlocked on associated retaining indentations (362, 364, 366, 368) of the base connecting device (160).

6. The wiper blade as claimed in claim 1, characterized in that the guide adapter (250) has pocket-like receiving elements (412, 414, 416, 418) into which associated projections (392, 394, 396, 398) of the base connecting device (160) engage.

7. The wiper blade as claimed in claim 1, characterized in that the connecting member (190) has a fastening member (730) configured to be mounted on the function adapter (280).

8. The wiper blade as claimed in claim 7, characterized in that the fastening member (730) is configured to be attached to a first multiplicity of different wiper arm types.

9. The wiper blade as claimed in claim 8, characterized in that the fastening member (730) is configured to be connected to an adapter element (750) which is configured to be attached to a second multiplicity of different wiper arm types which differ from the wiper arm types of the first multiplicity of wiper arm types, wherein the adapter element (750) and the function adapter (280) are separate elements, each releasably coupled to the fastening member (730).

10. The wiper blade as claimed in claim 9, characterized in that the adapter element (750) engages at least partially around the fastening member (730) in a claw-like manner.

11. The wiper blade as claimed in claim 7, characterized in that the connecting member (190) has a cover member (740) by means of which at least a plurality of different wiper arm types can be fixed to the connecting member (190).

12. The wiper blade as claimed in claim 11, characterized in that the cover member (740) is configured to be fastened to the fastening member (730) by means of a snap-in connection.

13. The wiper blade as claimed in claim 1, characterized in that the function adapter (280) has a bearing element (279) on which the connecting member (190) is configured to be mounted.

14. The wiper blade as claimed in claim 13, characterized in that the bearing element (279) has at least two wall elements (712, 714) aligned parallel to each other for at least partially laterally supporting the connecting member (190).

15. The wiper blade as in claim 1, wherein the sliding elements (382, 384, 386, 388) include a first, forward set of sliding elements (382, 384) and a second, rearward set of sliding elements (386, 388), the first set of sliding elements (382, 284) being spaced from the second set of sliding elements (386, 388) along a longitudinal axis of the wiper blade.

16. The wiper blade as in claim 1, wherein both the sliding elements (382, 384, 386, 388) and the guide elements (352, 354, 356, 358) are of an elongated S-shaped design.

17. The wiper blade as claimed in claim 1, wherein the movement is configured to occur while the sliding elements (382,384, 386, 388) are in contact with and sliding along the guide elements (352, 354, 356, 358).

18. The wiper blade as claimed in claim 1, wherein the movement includes at least two changes in direction of the function adapter (280).

19. The wiper blade as claimed in claim 1, wherein the movement includes at least three changes in direction of the function adapter (280).

20. The wiper blade as claimed in claim 1, wherein the movement is configured to occur while at least a portion of the guide adapter (250) is enclosed by the function adapter (280).

21. The wiper blade as claimed in claim 1, wherein the movement includes both translation and rotational movement of the function adapter (280).

22. An adapter unit (150) for attachment of a wiper strip (112), which is assigned to a wiper blade (100) for a window wiper, to a wiper arm (118), wherein the adapter unit (150) is configured to be fastened to a base connecting device (160) provided on the wiper strip (112) and is configured to be connected to a connecting member (190) assigned to a wiper arm (118), characterized in that the adapter unit (150) has a guide adapter (250) which is fastened permanently to the base connecting device (160) and which has guide elements (352, 354, 356, 358) which are at least partially three-dimensionally curved, which guide adapter is connected releasably to a function adapter (280) configured to be connected to the connecting member (190), which function adapter has sliding elements (382, 384, 386, 388) which are displaceable in a sliding fashion on the guide elements (352, 354, 356, 358) in such a way that the function adapter (280) is configured to be moved relative to the guide adapter (250) to move the function adapter (280) from a release position into a retaining position, wherein the movement includes at least one change in direction of the function adapter (280).

23. The adapter unit (150) as in claim 22, wherein the sliding elements (382, 384, 386, 388) include a first, forward set of sliding elements (382, 384) and a second, rearward set of sliding elements (386, 388), the first set of sliding elements (382, 284) being spaced from the second set of sliding elements (386, 388) along a longitudinal axis of the wiper blade.

24. The adapter unit (150) as in claim 22, wherein both the sliding elements (382, 384, 386, 388) and the guide elements (352, 354, 356, 358) are of an elongated S-shaped design.

* * * * *